US008320388B2

(12) United States Patent
Louati et al.

(10) Patent No.: US 8,320,388 B2
(45) Date of Patent: Nov. 27, 2012

(54) AUTONOMIC NETWORK NODE SYSTEM

(75) Inventors: Wajdi Louati, Courcouronnes (FR); Djamal Zeghlache, Etiolles (FR)

(73) Assignees: Groupe des Ecoles des Telecommunications (GET), Evry (FR); Institut National des Telecommunications (INT)

( * ) Notice: Subject to any disclaimer, the term of this patent is extended or adjusted under 35 U.S.C. 154(b) by 363 days.

(21) Appl. No.: 12/525,239

(22) PCT Filed: Feb. 2, 2007

(86) PCT No.: PCT/IB2007/050359
§ 371 (c)(1),
(2), (4) Date: Oct. 5, 2009

(87) PCT Pub. No.: WO2008/093174
PCT Pub. Date: Aug. 7, 2008

(65) Prior Publication Data
US 2010/0046531 A1    Feb. 25, 2010

(51) Int. Cl.
*H04L 12/28* (2006.01)
*G06F 15/173* (2006.01)
(52) U.S. Cl. ......... 370/401; 370/254; 370/392; 709/226
(58) Field of Classification Search .......... 370/230–252, 370/392–395, 401–468; 709/221–229
See application file for complete search history.

(56) References Cited

U.S. PATENT DOCUMENTS

| | | | |
|---|---|---|---|
| 7,266,120 B2 * | 9/2007 | Cheng et al. | 370/390 |
| 7,649,851 B2 * | 1/2010 | Takashige et al. | 370/254 |
| 7,656,872 B2 * | 2/2010 | Yoshimoto et al. | 370/392 |
| 7,761,595 B1 * | 7/2010 | Drennen et al. | 709/238 |
| 7,826,386 B2 * | 11/2010 | Beichter et al. | 370/252 |
| 7,843,851 B2 * | 11/2010 | Grammel | 370/254 |
| 8,014,411 B2 * | 9/2011 | Kazban et al. | 370/409 |
| 2002/0059427 A1 * | 5/2002 | Tamaki et al. | 709/226 |
| 2005/0180429 A1 | 8/2005 | Ghahremani et al. | |

(Continued)

FOREIGN PATENT DOCUMENTS
EP    1 653 688 A1    5/2006

OTHER PUBLICATIONS

Doria et al., "ForCES Protocol Specificaiton," *Network Working Group* (http://tools.ietf.org/html/draft-ietf-forces-protocol-08), Mar. 2006.

(Continued)

*Primary Examiner* — Man Phan
(74) *Attorney, Agent, or Firm* — Oliff & Berridge, PLC

(57) ABSTRACT

An autonomic network node system for providing at least one virtual router (VR) for providing on demand virtual routing service, the autonomic network node system includes a plurality of autonomic router components (ARCs) comprising at least one autonomic control component (ACC) and at least one autonomic forwarding component (AFC), physical resources comprising a plurality of logical resource partitions (LRPs), at least one database for storing information relating to the plurality of ARCs and LRPs, and a autonomic framework configured for receiving at least one request of on demand virtual routing service, accessing at the at least one database, allocating at least one LRP to perform at least one ARC to be installed in the autonomic network node system, installing the at least one ARC in the autonomic network node system, allocating the installed ARC and, updating the at least one database.

31 Claims, 6 Drawing Sheets

U.S. PATENT DOCUMENTS

2006/0092940 A1* 5/2006 Ansari et al. .................. 370/392
2008/0052719 A1* 2/2008 Briscoe et al. ................ 718/104

OTHER PUBLICATIONS

Louati et al., "Network-Based Virtual Personal Overlay Networks Using Programmable Virtual Routers," *IEEE Communications Magazine*, vol. 43, No. 8, Jul. 2005, pp. 86-94.

Kephart et al., "The Vision of Autonomic Computing," *Computer*, IEEE Computer Society, vol. 36, No. 1, Jan. 2003, pp. 41-50.

Kephart, "Research Challenges of Autonomic Computing," *27th International Conference of Software Engineering 2005*, St. Louis, MO, USA, May 15-21, 2005.

White et al., "Autonomic computing: Architectural approach and prototype," *Integrated Computer-Aided Engineering*, vol. 13, No. 2, 2006, pp. 173-188.

Jarrett et al., "Constructing an Autonomic Computing Infrastructure Using Cougaar," *Proceedings of the Third IEEE International Workshop on Engineering of Autonomic & Autonomous Systems*, Columbia, MD, USA, Mar. 27-30, 2006, pp. 119-128.

Yang et al., "Forwarding and Control Element Separation (ForCES) Framework," *IETF Standard*, Internet Engineering Task Force, Apr. 2004, pp. 1-40.

Khosravi et al., "Requirements for Separation of IP Control and Forwarding," *IETF Standard*, Internet Engineering Task Force, Nov. 2003, pp. 1-18.

* cited by examiner

AUTONOMIC NETWORK NODE SYSTEM

FIELD OF THE INVENTION

The present invention relates to network communication and Network Virtualization technology and, more specifically, to virtual routers system design supporting automated provisioning of virtual routing services.

BACKGROUND OF THE INVENTION

The Network Virtualization concept is used to provide separate logical networking environments (called Virtual Networks) over a single shared Networking Infrastructure (such as for example Network Provider backbone or Internet Service Providers). A Virtual Network (VN), known also as Overlay Network, is a group of Virtual Nodes achieved via node virtualization technology interconnected via Virtual Links (e.g. tunnels) achieved via data-path virtualization technology.

Virtual Network (VN) may be considered as a service provided "on demand" by a

Virtual Network Service Provider (VNSP) (such as carriers and network providers, Internet Service Providers) and delivered to Virtual Network Service (VNS) customers such as end-user clients (e.g. Personal Network user), enterprise customers (e.g. VPN customers) or Service Providers (such as VPN Service Providers, Routing Service Providers, QoS Service Providers, Internet service providers (ISPs), cellular operators, Application Service Providers (ASPs)...). A Virtual Network Service provides a logical networking environment responsible for supporting VNS customer control and data traffic, protocols and end-to-end services (such as QoS, VPN, Routing, etc). An SLA (service level agreement) is usually negotiated between VNS customers and their VNSPs offering Virtual Network services.

The VNSP may be either the owner of one or multiple network infrastructures (such as global Tier-1 ISP, network providers); or may be a third-party provider having an SLA with one or multiple network service providers and carriers offering network infrastructure capable of supporting their Virtual Networks Services deployment. A VNSP itself may be a VNS customer of another VNSP known as a "carrier of carriers" offering Virtual Network services. When the Virtual Network service is provided by a personal or private network, the VNSP is the user or equivalently the personal or private network itself. A person, an end-user, or a company may be viewed as a VNSP offering VNS to other persons or employees in the case of personal networks, group communications and federations of personal and private networks. The network domain administered by one single VNSP may be called a VNSP network.

A customer may want VNS from a VNSP network not administered by its VNSP but by other VNSPs. In this scenario, an inter-VNSP cooperation and negotiation (via an SLA) may be established to provide the desired VNS for customers visiting a network managed by different VNSPs.

By using the OSI model Layer 3 network virtualization technology, a Virtual Network comprises of a group of Virtual Routers (or Virtual Routing Instances) interconnected via Virtual Links (or tunnels). Hence, the Virtual Network Service (VNS) itself comprises two services: Virtual Routing Service (VRS) and Virtual Link Service (VLS). The VNSP provides a VNS comprising both VRS and VLS services.

The Virtual Link Service (VLS) may be achieved by either layer 2 or layer 3 tunnels (such as IPsec, MPLS, L2TP, GRE, IP-in-IP tunnels etc), or direct layer 2 of the OSI model connections such as ATM and Frame Relay. The Virtual Link Service (VLS) is offered to the VNS customer to interconnect the Virtual Routing Services (VRS) across the VNSP backbone.

The Virtual Routing Service (VRS) is a networking process which forwards VNS customer control and date traffic from sources to destinations, within the Virtual Network, based on routing tables and protocols. The Virtual Routing Service (VRS) is supported by VNSP edge routers located in the VNSP network. The VNSP edge routers may be any nodes located in the VNSP network that has routing capabilities. The VNSP edge routers may be provider edge routers, customer edge routers, wireless access routers, gateways, as well as any node in a personal or private network with routing capabilities.

The VNSP edge router may be based on the Virtual Routing concept (a node virtualization technology) to handle multiple Virtual Routing Services. The Virtual Routing concept subdivides a physical router into either multiple virtual routing and forwarding (VRF) instances or multiple independent and separate Virtual Routers (VRs) supported by the same physical router. Each VRF is composed of an IP routing table, a forwarding table, a set of interfaces that use the forwarding table and a set of protocols and rules responsible for associating Virtual Network routes to the appropriate forwarding table. Each Virtual Router (VR) may be an emulation of a physical router including mechanisms and tools for management, configuration, monitoring and maintenance. One virtual router instance may be seen as one VRF instance augmented by these additional mechanisms and tools. Each VR may have its own forwarding and routing tables and protocols, its own management and maintenance functions, its own IP network services, and its own physical or/and logical network interfaces. The VR may appear to the VNS customer as a dedicated physical router. Many VR instances may run on a single physical router by using Software based Virtualization approaches. VR instances may have independent IP routing and forwarding tables isolated from each other. VR instances may share centralised physical resources such as route processor and forwarding processor, memory to perform their routing and forwarding processing, but may be kept logically separated.

The VRS is supported by either one VRF or one VR instance in the VNSP physical edge router. A VRF instance may be viewed as a simplified VR instance composed only of a simple routing and forwarding instances. Accordingly, the term "VR instance" is to be read as encompassing a "VRF instance".

An alternative technology, related to VRs implementation, called Logical Router (LR) or "Multi-router", consists of handling, into one single chassis, multiple separated physical routers (Hardware based Virtualization) with dedicated processing and memory resources (compared to the VR technology using multiple Virtual Routers sharing physical resources). This technology provides a new model for control plane processing by providing distributed and dedicated route processing engines (e.g. CPUs) and memory buffers for each router. One logical router (LR) may support multiple Virtual Routers (VRs).

The virtual routing service (VRS) is used to support:
router consolidation, which means consolidating multiple logical/virtual routers into one single physical router, and which may be used to deploy edge, aggregation and core routers together in the same router chassis located in a network point of presence (PoP), service and network consolidation thanks to which different IP services or different networking technologies, maintained by virtual routers, may be supported by the same physical router, wholesale router business model which may be performed by selling to customers the access to and use of virtual routers hosted by providers, per-Virtual Network routing services maintaining:
- IP connectivity and networking such as broadband access network connectivity, overlay networks,
- value added IP network services such as IP virtual private network, IP quality of service (QoS), and voice over IP (VoIP), routing service,
- service differentiation. For instance, per-application QoS guarantee may be provided by the virtual routing service technology since one virtual router can be dedicated for routing real-time applications, such as voice over IP (VoIP) and video conferencing, and another VR for routing best-effort applications and so on,
- new network services deployment. Virtual routing service provides a virtual framework and network to support new routing and addressing spaces for new network services deployment (such as IPv6) in physical routers.

The idea of sharing underlying network infrastructures may provide to VNS customers (e.g. Service Providers, ISPs) the ability to extend their services, their reach and network coverage into new geographical areas and regions in a reliable, secure and scalable manner. VNSP like large backbone network providers and operators may offer cost-effective per-customer Virtual Network through their physical edge routers, located in their PoP, incorporating virtual routing technology. These physical edge routers may be shared by multiple service providers and ISPs (i.e. VNS customer) with no physical presence in the geographical area.

With this technology, ISPs (i.e. VNS customer) may not have to install new physical PoP and routers to offer IP services and connectivity such as for example wholesale broadband access services to end users located in new geographical regions and areas. They may simply allocate or purchase VNS service from a VNSP edge router of existing PoP already located in the area where the ISP intends to serve their end users with global Internet access. The customers may gain complete access to and management of their own virtual routers handled by the VNSP network.

An exemplary application of Virtual Network Services is related to network based IP virtual private network (VPN) services. VPN service providers use virtual routing technology to ensure private networking by offering per-VPN services to their customers (e.g. enterprise customers). A VPN service provider may be seen as a Virtual Network Service Provider (VNSP) offering secure Virtual Networks to VPN customers (i.e. VNS customers).

When a VNS customer requires virtual routing service(s) from its VNSP, an SLA may be established and operation and maintenance costs be negotiated. The VNSP may allocate, beforehand, virtual router instance(s) for the VNS customer during an initial VR provisioning phase and configure its physical routers to support the customer's VR(s).

The VNSP may assign to the customer's VR(s) the appropriate physical and logical network interfaces, ports, policies, routing functions and parameters based on customer-specific information and requirements and the SLA. In addition, the VNSP activates the appropriate routing protocol instances (customer and inter-VR routing protocols) related to the specific customer and backbone network requirements. Once the VR is successfully provisioned, the VNSP may either manage the customer VRs using management protocols, policies, and interfaces capable of activating and deleting the VR instances; or outsource the VRs management to the customers.

The first challenge may be the fact that a VNS customer may unpredictably require dynamic deployment of new IP service and reconfiguration of its provisioned VR, or may require new or temporary allocation and provisioning of new virtual router instances in certain physical edge routers which are either managed by its VNSP or managed by other VNSPs.

Indeed, customers may need a dynamic reconfiguration of their VRs due to routing information changes such as changing routing protocol, dynamic membership and topology update. Customers may also require dynamic deployment of new IP service (e.g. VPNs, NAT, firewall . . . ). Likewise, when customers visit new geographical areas or new VNSP networks, they may be dynamically bound to physical edge routers which do not maintain beforehand any VR configuration, for example when the physical edge router is managed by the customer's VNSP, or any SLA for example when the physical edge router is managed by other VNSP, for the new customers.

For instance, mobile VPN users may visit new geographical region and want temporary access to their remote private networks (remote VPN sites). The VNSP may then have to intervene to manually or remotely provision and configure, although not at run time, the on demand VPN routing service in its physical edge routers to support new VR instances or to ask other VPN Service Providers having common SLA to provision VRS services for their customers/users.

Another example concerns ISP customers which need to extend their networks reach and coverage to provide "temporary" global Internet access and connectivity to their end-user clients located in new geographical regions. "Temporary" means connectivity for a short period of time. The VNSP (global Tier1 ISP) may have to intervene to manually provision routing services for the ISP customers, in their appropriate edge routers.

In conclusion, the provisioning of new VR, deployment of new IP services, reconfiguration and removal of VRs installed in physical edge routers may require complete intervention of VNSP which manually provision VRS for their customers.

However, the frequent intervention of VNSPs each time a customer demands, unpredictably, dynamic reconfiguration and temporary allocation and provisioning of virtual routing service for just a short period of time may be neither efficient nor profitable for VNSPs and VNS customers. The manual VNSP involvement is costly, time-consuming process and can even increase provisioning and management complexity for service providers with possible service misconfigurations. The VNSP should provision and configure VRs for its customers quasi instantaneously and at run time without the need of any manual provisioning of on demand virtual routing services requested by customers. An automated VR service provisioning process may be required in this case.

Another challenge is that the VNS customer may need complete self-provisioning, self-control, self-configuration and self-management of their VRs without any VNSP intervention. In this case, the VNSP may authorise its customers to allocate and self-provision their VRs based on rules, policies, authorisation and access control procedures.

In fact, VNS customers may not trust any service provider to control their internal traffic and routing processing. VNS customers may also require personalising their routing protocols and VRs configuration through customisable self-service interfaces without the intervention of any service provider manipulation. The VNS customers may want to benefit from high performance forwarding supported by edge routers located in VNSP networks while remotely self-controlling their routing processing. This may improve networking scalability, flexibility and performance and may allow customers to have end-to-end routing control. However, current virtual routers designs allow only limited and restricted control and configuration operations authorised by the VRs administrator. Routing and forwarding processes are both configured and controlled by the VNSPs.

However, current virtual routers design does not provide a flexible and dynamic framework. A dynamic framework may enable configuration of installed VRs at run time, and be able to provision instantaneously new and on demand VRs for new customers. The current virtual routers design does not provide automated provisioning of on demand virtual routing services required by VNS customers.

A further limitation concerns the number of VR instances that a physical edge router can support e.g. scalability. Indeed, each VR instance uses physical router resources such as memory, processors . . . which are limited and depend on the router performance and capacity. Using different routing protocols in each VR instance such as the inter-VR routing, customer routing and backbone routing as well as using multiple tunnels per VR which depend on the VRs topology per VPN, may increase the resource utilisation and then decrease the number of VRs per physical edge router. A backbone VR may improve this scalability constraint by multiplexing tunnels in one tunnel established between backbone VRs pair.

Recently both the IETF ForCES (forwarding and control element separation) framework, proposed by the IETF (Internet Engineering Task Force) community and disclosed in the publication Yang, L., et al. "forwarding and control element separation (ForCES) framework". RFC 3746, April 2004, and the SoftRouter router disclosed by US 2006 0092940 are providing disaggregation concept of router hardware from router software using standard interfaces and protocols. ForCES and SoftRouter disclose architectures that separate the control plane from the forwarding plane functions. Two logical entities have been defined:

control element (CE) responsible for performing routing, signalling and control functionality in the router, forwarding element (FE) responsible for performing forwarding and switching functionality in the router.

Two protocols are used to manage and communicate with the CEs and FEs entities: dynamic binding protocol and FE/CE transport protocol.

The dynamic binding protocol is responsible for discovering CEs and FEs availability and capabilities, and the association between them. Once the binding is established, the FE/CE transport protocol communicates and exchanges data and control information between the separated CEs and FEs. The ForCES working group is currently defining the ForCES protocol specifications [A. Doria, et al., "ForCES protocol specification", Internet draft, March 2006] to standardise information exchange between the control and the forwarding plane in a ForCES router.

Two association phases are considered: pre-association phase and post-association phase:

During the pre-association phase, a CE manager and FE manager determine which CEs and FEs are composing the router:

The CE manager is a logical entity that maintains the list of CEs performing the router control plane and is responsible for the FE discovery process by determining with which FE(s) a CE should communicate within the ForCES router.

The FE manager is a logical entity that maintains the list of FEs performing the router forwarding plane and is responsible for the CE discovery process by determining to with which CE(s) an FE should communicate within the ForCES router.

The SoftRouter dynamic binding protocol may operate in the pre-association phase between the CE manager and FE manager to exchange and communicate CE/FE discovery process information. The CE manager (respectively the FE manager) informs the CEs (respectively informs the FE(s)) of the CEs-FEs association decisions made during the pre-association phase.

In the post-association phase, and once the FE(s) and CE(s) know each other, communication between CEs and FEs inside the router, including exchange of data packets and control messages is achieved via the FE/CE transport protocol (such as the ForCES protocol).

FIG. 1 represents the functional model of a network node system, called also Virtual Routers system, for providing VRs as well as its implementation in a physical edge router 309.

As depicted in FIG. 1, the physical edge router 309, such as a provider edge (PE) router, that implements the virtual routers system may be connected to two networks: customer networks 305 and backbone networks 306. Physical network connections 321, such as for example Ethernet cable, optical fibre, radio links, may connect the edge router 309 to both customers and backbone networks. Multiple VR instances may be running on the physical edge router.

FIG. 1 details a virtual router instance 300 design comprising three interdependent functional planes: management plane 301, control plane 302 and forwarding plane 303. Other VR instances 322 handled by the physical edge router 309 may have the same functional model design as VR 300.

The management plane of the physical edge router may be subdivided into multiple logical VR management domains.

The VNSP may be able to manage separately VRs installed in its edge router. Each VR management plane may include maintenance, monitoring and management functions.

FIG. 1 depicts an example of a management plane 301 of VR 300. Management information data base module such as policy information base (PIB) and management information base (MIB) module objects may be used and managed through management protocols such as common open policy service (COPS) and simple network management (SNMP) protocols. Each VR instance may have a unique identifier (VR-ID) used by the VNSP to bind physical and logical network interfaces to the VR and to configure its parameters and networking processes. The VNSP may also use the VR identifier (VR-ID) to create, activate and delete the VR instance.

FIG. 1 depicts an example of control plane 302 of VR 300. The control plane 302 includes routing processes, signalling, value added IP services (VPN tunnelling, QoS, NAT, security (firewall), etc. . . . ). Just like a physical router, routing protocols and table, QoS functions (metering, shaping, classification, policing and scheduling), security functions (policy based routing, firewall, access list), tunnelling mechanisms (e.g. IPsec key negotiation) and signalling protocol (e.g. RSVP) may be configurable and controllable on a per-virtual routing service basis within a VR.

The routing processes 317 of control plane 302 may implement routing protocols responsible for creating routing tables (routing information bases, or RIBs) based on the network topology and routing information exchanged with neighbour ing routers. Each VR instance may maintain three independent routing processes:
- inter-VR routing process 319 used to distribute routing information, such as VPN reachability information, via tunnels or directed network links between the VR 300 and other neighbouring VRs that are members of the same virtual routing service,
- customer routing process 318 used between the VR 300 and the customer routers (e.g. customer edge routers in the case of VPN routing service); the routing protocol used in the VR is the same as the one used in the customer network (e.g. VPN site) attached to the VR,
- backbone routing process used between the VR 300 and the VNSP backbone network. This routing process may be needed for exchanging connectivity information (e.g. tunnel information) between VRs using the backbone routing protocol. The VRs may use a backbone VR 312, for the backbone routing process across the backbone. In this case, the VR 300 may not need to handle a specific backbone routing process.

FIG. 1 also depicts the forwarding plane 303 (or data plane) of VR 300: this plane handles the VR forwarding process 320 responsible for packet processing and forwarding functions in the VR and supports a forwarding table, for example a forwarding information base 330 (FIB), updated by the routing processes and used to forward IP packets. Packets are forwarded to customer and neighbouring routers via virtual network connections 307 for example such as IPsec tunnels, established over physical network connections 321, such as for example Ethernet cable, optical fibre, wireless connections.

A particular VR instance, called basic virtual router instance 304, represents the main router of the physical edge router and is reserved for the VNSP administrator that manages the VRs. The same VR planes and functionalities previously described may be used in the basic virtual router instance 304. This particular VR instance 304 may include auto-discovery mechanisms needed by the other VR instances to automatically distribute and exchange control VPN information. The basic virtual router instance may support the backbone routing process and may also maintain the optional backbone VR 312 that performs the backbone routing process in this case.

A physical edge router 309, such as PE, may support multiple VR instances that share its physical resources such as physical control engines 313 including for example memory and route processors, physical forwarding engines 314 including for example memory and forwarding processors and network interfaces 316, such as for example line cards, network interface cards.

The route processor which is for example a general-purpose processor included in the physical control engine 313 performs routing processes of VRs (such as routing processes 317). The route processor may use memory modules to store routing information and tables.

The physical forwarding engine 314 may include hardware engines responsible for performing forwarding processes of VRs, such as forwarding process 320, and they may either be centralised or distributed in line cards, daughter boards or stand-alone boxes. The physical forwarding engine may include memory and forwarding processors which may comprise network processors, ASIC (Application Specific Integrated Circuit), programmable network processing units (NPUs) or general-purpose processors. The physical forwarding engines 314 may communicate with physical control engines 313 through switch fabrics 315.

The network interfaces 316 may support multiple physical network connections 321 such as for example Ethernet cable, optical fibre, wireless connections to satisfy customer and backbone networks connectivity. The network interfaces may be either logical or physical interfaces directly connected with the physical forwarding engines 314. In the case of using line cards as physical network interfaces, the physical forwarding engines 314 may be distributed in the line cards. Each VR may have dedicated logical or/and physical interfaces. Multiple VRs may share physical network interfaces by using multiple logical network interfaces.

SUMMARY

Various deficiencies of the prior art may be addressed by the invention.

In exemplary embodiments, the invention provides an autonomic network node system for providing at least one virtual router (VR) for providing on demand virtual routing service, the autonomic network node system comprising:
- a plurality of autonomic router components (ARCs) configured for providing at least one virtual router (VR) instance, the ARCs comprising:
  - at least one autonomic control component (ACC) operating in a VR control plane,
  - at least one autonomic forwarding component (AFC) operating in a VR forwarding plane,
- physical resources comprising a plurality of logical resource partitions (LRPs) for performing the ARCs,
- at least one database for storing network node system information relating to the plurality of ARCs and LRPs, and
- an autonomic framework configured for
  - receiving through a system interface at least one request of on demand virtual routing service,
  - accessing at the at least one database,
  - based on the network node system information and the at least one request:
    - allocating at least one LRP to perform at least one ARC to be installed in the autonomic network node system, installing the at least one ARC in the autonomic network node system and allocating the installed ARC to provide the at least one requested virtual routing service
    - and/or,
    - allocating at least one already installed ARC to provide the at least one requested virtual routing service,
    - and
  - updating the at least one database to store information relating to the allocated at least one ARC and/or the at least one LRP and to the provided on demand virtual routing service.

"Installing an ARC" may mean installing the ARCs software code. [a confirmer] Such software code may be included in the request of on demand virtual routing service.

An already installed ARC may be an ARC already available in the autonomic network node system when the network node system is provided.

The autonomic network node system may also be called autonomic virtual routers (AVRs) system.

As defined by IBM (see URL http://www.research.ibm.com/autonomic/), "the autonomic computing is an approach to self-managed computing systems with a minimum of human interference. The term derives from the body's autonomic nervous system, which controls key functions without conscious awareness or involvement". An autonomic system may be able to self-govern, self-manage and self-control its internal behaviour, functions, components and operations without any manual intervention or external help.

In exemplary embodiments, the autonomic network node system provides at least one VRF instance and the plurality of ARCs is composed of AFCs and ACCs.

In exemplary embodiments, the plurality of ARCs may further comprise at least one autonomic management component (AMC) operating in a VR management plane.

An autonomic network node system is a network node system that can manage itself in accordance with high-level goals and policies that represent business-level objectives from the virtual network service providers or customers/users. The autonomic network node system may comprise physical and software resources and deliver virtual routing services to customers and other network architectures without the intervention of the VNSP.

The autonomic framework is a network framework that may support the autonomic network node system-level self-management, self-organisation, self-configuration, self-adaptation, self-control, self-deployment, self-healing, self-optimisation and self-protection behaviour. The autonomic framework may support automated provisioning processes of on demand virtual routing services (VRS) in VNSP edge routers for example any of provider, customer or personal edge router that includes the autonomic network node system for providing the VRs.

An ARC is an autonomous, standard and modular building block component which operates in the autonomic network node system.

A LRP is a partition of the physical resources.

The autonomic network node system for providing VRs, which relies on autonomic computing concept and framework, may enable to achieve the virtual routers system level goal related to the automated VRS provisioning processes.

An autonomic network node system may enable to self-manage the router components and their interactions An autonomic network node system according to exemplary embodiments of the invention is a new design of a virtual routers (VRs) system that may support automated provisioning process of on demand virtual routing services (VRS) in virtual network service provider (VNSP) edge routers.

The network node system information may comprise status information related to the plurality of LRPs and ARCs and identification information related to the plurality of LRPs, ARCs and the at least one VR instance.

The at least one database may comprise an ARC-library for storing information related to the plurality of ARCs and a LRP-library for storing information related to the plurality of LRPs.

In exemplary embodiments, each of the ARC-library and the LRP-library may comprise at least one sub-library.

In exemplary embodiments, the database may include a library in which information related to both ARCs and LRPs may be stored.

In a variant embodiment, the database may include at least one library located outside the autonomic network node system and the autonomic network node system may be configured for accessing at this library.

At least one ARC may comprise at least one software component operating in the router on heterogeneous platforms and operating systems.

The at least one software component of an ARC may be configured for dynamically interacting with at least one software component of a different ARC and based on input/output ports and interfaces.

The at least one software component may comprise at least one sub-component responsible for providing at least one function (e.g. packet processing functions).

The software component may be one of self-configuring, self-adapting and self-organising software component.

"Self-configuring" means that the software component may be able to configure and reconfigure itself and its sub-components automatically.

"Self-adapting" means that the software component may be able to adapt itself and its sub-components automatically.

"Sself-organising" means that the software component may be able to coordinate and organise itself and its sub-components automatically, The plurality of LRPs may comprise logical forwarding partitions (LFPs) and logical control partition (LCPs).

The autonomic network node system may comprise at least one AVRs-ACC manager associated with at least one ACC and at least one AVRs-AFC manager associated with at least one AFC.

The autonomic network node system may comprise a VR-ACC manager associated with at least one ACC of the at least one VR instance and a VR-AFC manager associated with at least one AFC of the at least one VR instance, each VR instance having at least one LCP performing the at least one ACC and at least one AMC and at least one LFP performing the at least one AFC.

In exemplary embodiments, the autonomic framework may comprise an autonomic engine comprising an autonomic manager and autonomous entities for operating the plurality of ARCs and LRPs.

The at least one database may comprise a knowledge database comprising entries related to at least one of:
process-identifier (process-ID)
VR-ID,
ARCs-ID list,
VR-ACC manager-ID,
VR-AFC manager-ID.

A "knowledge database" is a collection of information that the autonomic manager may use. The knowledge database may capture information from the internal/external environment, may standardise the information so that it may be used by the autonomic manager, and may enable new knowledge to be created and even discovered and learned.

The ARCs-ID list may comprise an AMC-ID list, an AFC-ID list and an ACC-ID list.

The autonomic engine and the autonomous entities may comprise agents configured for communicating.

In exemplary embodiments, the autonomic network node system may comprise a system interface for receiving requests for on demand virtual routing service.

The system interface may comprise a policy based management framework including a policy manager configured for:
receiving VR provisioning requests from a VNSP manager, VNS customers and at least one other router,
analysing the VR provisioning requests and generating policies forwarded to the autonomic framework.

In exemplary embodiments, the system interface may comprise an authentication, authorisation and accouting (AAA) module configured for authenticating VNS customers, authorising VNS customers to provision VRS and tracking consumption of router resources by VNS customers.

In exemplary embodiments, the autonomic manager may be configured for receiving policies from the policy manager running in the system interface, analysing policies and for operating the autonomous entities to provide the requested on demand virtual routing service based on these policies.

"Operating the autonomous entities" means coordinating and managing the autonomous entities.

In exemplary embodiments, the autonomous entities may comprise a LRP state entity, the LRP state entity comprising an agent and a LRP status table. Each LRP status table may comprise entries related to a LRP identifier and a LRP status.

In exemplary embodiments, the autonomous entities may comprise an ARC-LRP binding entity comprising an agent and an ARC-LRP binding table.

The ARC-LRP binding table may comprise entries related to an ARC identifier and identifiers of at least one LRP performing an ARC.

In exemplary embodiments, the autonomous entities may comprise an AVRs-ARC library entity for storing information related to ARCs available in the autonomic network node system, the AVRs-ARC library entity comprising an agent and an AVRs-ARC library database.

The AVRs-ARC library database may comprise an ARC identifier, a status of this ARC and the identifier of a VR comprising the ARC.

In exemplary embodiments, the at least one database may comprise the knowledge database, the ARC-LRP binding table, the AVRs-ARC library database and the LRP status table.

In exemplary embodiments, the autonomous entities may comprise a physical resources allocation entity configured for allocating LRPs from the ARC-LRP binding entity based on status information in the LRP status table.

The physical resources allocation entity may be configured for allowing installation of a new ARC in the autonomic network node system, creation of an ARC-ID for the new ARC in the ARC-LRP binding table and for updating the AVRs-ARC library database.

In exemplary embodiments, the autonomous entities may comprise a logical components allocation entity configured for transferring ARCs performed by LRPs from the ARC-LRP binding entity to the AVRs-ARC library entity and allocating ARCs based on their status in the AVRs-ARC library entity following an allocation procedure conducted by the autonomic engine.

"Transferring" may be understood as downloading ARCs from an autonomous entity and uploading these ARCs in another autonomous entity.

In exemplary embodiments, the agent of the LRP state entity and the agent of the ARC-LRP binding entity may be configured for binding at least one ARC and at least one LRP.

The LRP state entity may comprise a LCP state entity instance and LFP state entity instance related to the LCPs and LFPs respectively.

The ARC-LRP binding entity may comprise an AMC-LCP binding entity instance, an ACC-LCP binding entity instance and an AFC-LFP binding entity instance related to the AMCs, ACCs and AFCs respectively.

The LRP state entity and the ARC-LRP binding entity may be configured for interacting to update their contents.

The AVRs-ARC library entity may comprise an AVRs-AMC library entity instance, an AVRs-ACC library entity instance and an AVRs-AFC library entity instance related to the AMCs, ACCs and AFCs respectively.

The AVRs-ARC library entity may be configured for interacting with the AVRs-ACC manager and the AVRs-AFC manager.

The AVRs-ARC library entity may be configured for interacting with at least one VR management plane.

In exemplary embodiments, the autonomic network node may be based on a fourth generation edge router architecture.

Exemplary embodiments of the invention also provide a method for providing at least one virtual router for providing on demand virtual routing service in an autonomic network node system comprising a plurality of ARCs configured for providing at least one VR instance, the ARCs comprising: at least one ACC operating in a VR control plane, and at least one AFC operating in a VR forwarding plane, physical resources comprising a plurality of LRPs for performing the ARCs, at least one database for storing network node system information relating to ARCs and LRPs, and an autonomic framework, in which method the autonomic framework:

receives at least one request of on demand virtual routing service through a system interface, accesses at the at least one database, based on the network node system information and the at least one request:

allocates at least one LRP to perform at least one ARC to be installed in the autonomic network node system, installs the at least one ARC in the autonomic network node system and allocates the installed ARC to provide the at least one requested virtual routing service, and/or allocates at least one already installed ARC to provide the at least one requested virtual routing service, and updates the at least one database to store information relating to the allocated at least one ARC and/or the at least one LRP and to on demand virtual routing service.

In exemplary embodiments, the ARCs may further comprise at least one AMC operating in a VR management plane.

In exemplary embodiments, the request may be received from a VNSP and the requested virtual routing service may be provided without any intervention from a VNSP manager.

In other embodiments, the request may be received from a customer self service and the requested virtual routing service may be provided without any intervention from a VNSP manager.

In exemplary embodiments, the physical resources allocation entity may be configured for:

during an initial state, allocating LRPs from the ARC-LRP binding entity stated as "ready" in the LRP status table available to perform new ARCs to be installed in the network node system and provided by customers self-service or a VNSP manager in the autonomic network node system, once LRPs are successfully allocated, executing the new required ARC, stating these LRPs as "allocated" in the LRP status table and installing the new ARC in the autonomic network node system, creating a ARC-ID for the new ARC in the ARC-LRP binding table and transferring the ARC-ID to the AVRs-ARC library entity with ARC status marked as "new".

In exemplary embodiments, the logical components allocation entity may be configured for:

during an initial state, transferring all ARCs performed by at least one LRP from the ARC-LRP binding entity to the AVRs-ARC library entity, during an autonomic state, allocating ARCs stated as "ready" from the AVRs-ARC library entity following an allocation procedure conducted by the autonomic engine.

The initial state may be the state that takes place just after the start up of the autonomic network node system. The autonomic state may be the state that takes place just after the initial state of the autonomic network node system and may be triggered through the autonomic engine.

Once ARCs are allocated, they may be stated as "allocated" in the AVRs-ARC library database.

In an exemplary embodiment, the received request of on demand virtual routing service may comprise a request identifier comprising at least one of a customer or VNSP identifier, a membership identifier and a process type information of the requested service provided.

In another exemplary embodiment, the received request may comprise a "VR creation" request object, in which method a VR instance is created for the customer if no VR instance is already installed in the autonomic network node system.

In another exemplary embodiment, the received request may comprise a "VR configuration" request object, in which method ARC components in a VR instance already installed in the autonomic network node system are configured and/or changed.

In another exemplary embodiment, the received request may comprise a "VR removal" request object, in which method a VR instance already installed in the autonomic network node system is removed.

In another exemplary embodiment, the received request may comprise a "value added service deployment in VR" request object, in which method the need for deploying new services in an already created VR instance is informed.

In another exemplary embodiment, the received request may comprise a logical components allocation process in which method a VNSP manager or a customer self-service allocates at least one ARC component available in the autonomic network node system.

The received request may comprise a data part and the autonomic manager, based on the data part, may allocate at least one required ARC from the AVRs-ARC library entity via the logical components allocation entity.

The received request may comprise a physical resources allocation process in which a VNSP manager or a customer self-service allocates a plurality of LRPs to install their own ARCs in the autonomic network node system.

In another exemplary embodiment, the received request may comprise a data part comprising ARCs software codes, and the autonomic manager may allocate at least one LRP from the ARC-LRP binding entity, via the physical resources allocation entity, to install the ARCs software codes.

In another exemplary embodiment, the received request may comprise a data part comprising VR creation information providing parameters and capabilities information needed for the VR instance creation, and the autonomic manager, based on the VR creation data information, may be configured for allocating at least one required ARC available in the autonomic network node system to create the VR instance.

In another exemplary embodiment, the received request may comprise a data part comprising service deployment information providing parameters and capabilities information needed for the service creation and deployment in the VR, and, based on the service deployment data information, the autonomic manager may be configured for allocating at least one required ARC available in the autonomic network node system to create the service components and deploy them in the VR.

In another exemplary embodiment, the received request may comprise a data part comprising VR configuration information providing information about updates and modifications of at least one already created VR instance, and, based on the VR configuration data information, the autonomic manager may be configured for updating or modifying the appropriate ARCs providing the VR instance.

The autonomic manager may be configured for self-installing the software codes in the autonomic network node system for VR creation, configuration or service creation and deployment.

Exemplary embodiments of the invention also provide a computer program product storing instructions that, when executed by a computer system, perform a method for providing at least one virtual router for providing on demand virtual routing service in an autonomic network node system comprising a plurality of ARCs configured for providing at least one VR instance, the ARCs comprising: at least one ACC operating in a VR control plane and at least one AFC operating in a VR forwarding plane, physical resources comprising a plurality of LRPs for performing the ARCs, at least one database for storing network node system information relating to ARCs and LRPs, and a autonomic framework, in which method, the autonomic framework receives at least one request of on demand virtual routing service through a system interface, accesses at the at least one database, based on the network node system information and the at least one request to provide the at least one requested virtual routing service allocates at least one LRP to perform at least one ARC to be installed in the autonomic network node system, installs the at least one ARC in the autonomic network node system and allocates the installed ARC to provide the at least one requested virtual routing service and/or allocates at least one already installed ARC to provide the at least one requested virtual routing service and, updates the at least one database to store information relating to the allocated at least one ARC and/or the at least one LRP and to on demand virtual routing service.

In exemplary embodiments, the plurality of ARCs may further comprise at least one AMC operating in a VR management plane.

BRIEF DESCRIPTION OF THE DRAWINGS

It is to be understood that both the foregoing general description and the following detailed description are exemplary and explanatory only and are not restrictive of the invention. the accompanying drawings, which are incorporated in and constitute a part of this specification, illustrate several exemplary embodiments of the invention and together with the description, serve to explain principles of the invention.

DETAILED DESCRIPTION

In order to support automated provisioning processes of virtual routing services in VNSP edge routers, an autonomic network node system for providing programmable and autonomic virtual routers (AVRs) may be required:

to enable the VNSP to automatically set up virtual router instances and IP services, in its physical edge router, to support virtual routing services based on customer-specific information and configuration in a cost-effective, flexible, fast and dynamic manner. Manual interventions may not be needed by the VNSP manager for the services provisioning process. This may reduce cost and management complexity for VNSPs and speed up routing service provisioning time. Following on demand virtual routing service queried by the VNS customer, the VNSP manager sends VR provisioning requests (including new VR installation, VR configurations or VR removal) to its edge routers supporting the autonomic network node system. The autonomic network node system may self-manage, self-provision, self-allocate, self-create and self-configure the VRs at run time on behalf of the VNSP manager and achieve all these based on the provider provisioning queries and policies. This automatic provider provisioning aspect is called "automated provider provisioning virtual routing services process".

to enable the VNS customer self-service to automatically self-provision, self-deploy, self-control, self-configure and self-manage their VRs and IP services based on self-service provisioning rules without the intervention of the VNSP manager. The autonomic network node system may self-manage, self-provision, self-allocate, self-create and self-configure the VRs at run time to achieve the VRS provisioning for customer self-service. The automated self-service provisioning process may not impact the other VRs running in the provider edge routers. This self-provisioning aspect is called "automated customer self-provisioning virtual routing services process".

The forthcoming detailed description focuses on the design of an autonomic network node system for providing on demand virtual routers (VRs) to support the automated virtual routing service provisioning processes for both "automated provider provisioning virtual routing services" and "automated customer self-provisioning virtual routing services" processes.

Figure 1:
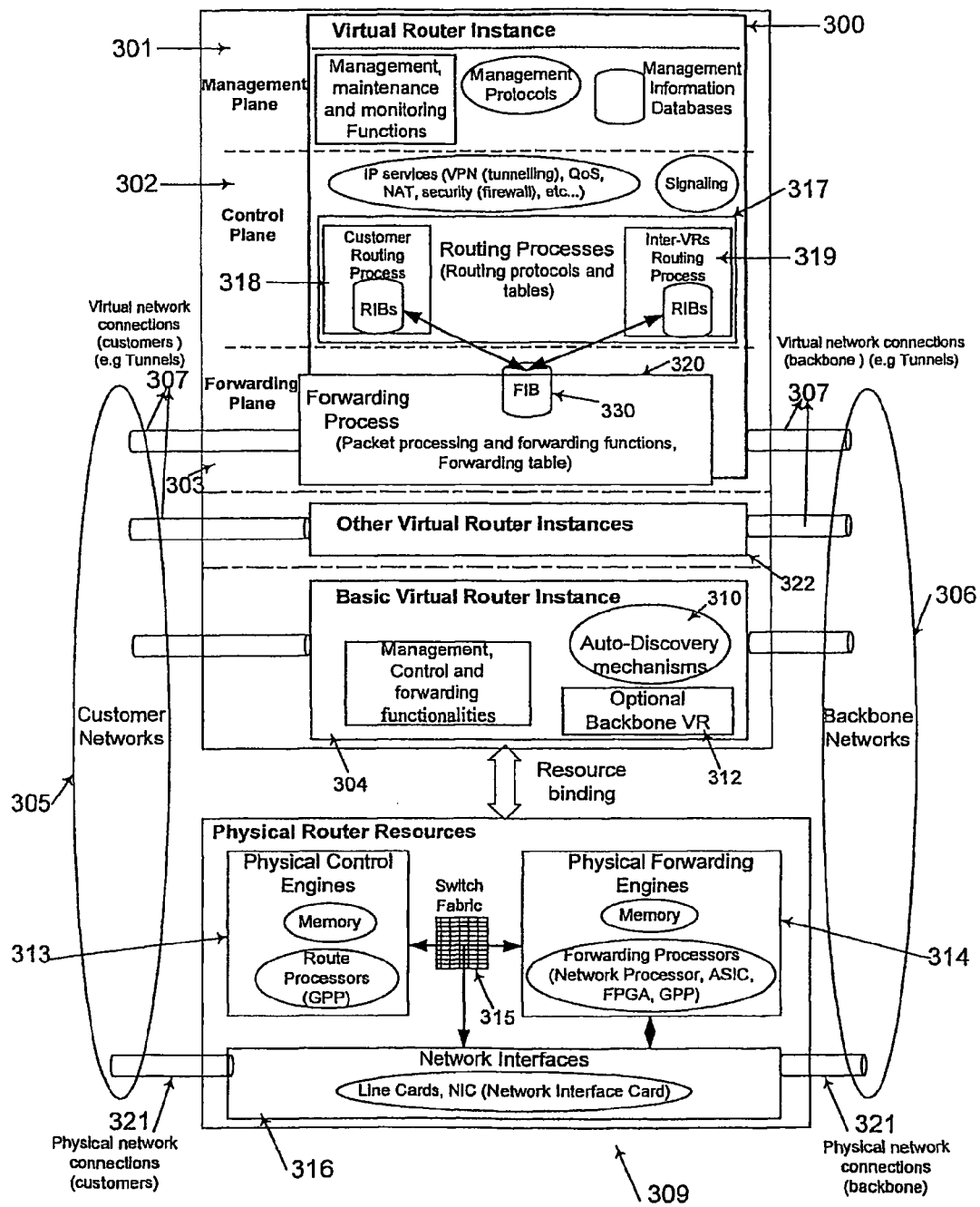
FIG. 1, designated as prior art, is an already-described example of an architecture illustrating a functional model of a typical virtual routers system design.
Figure 2:
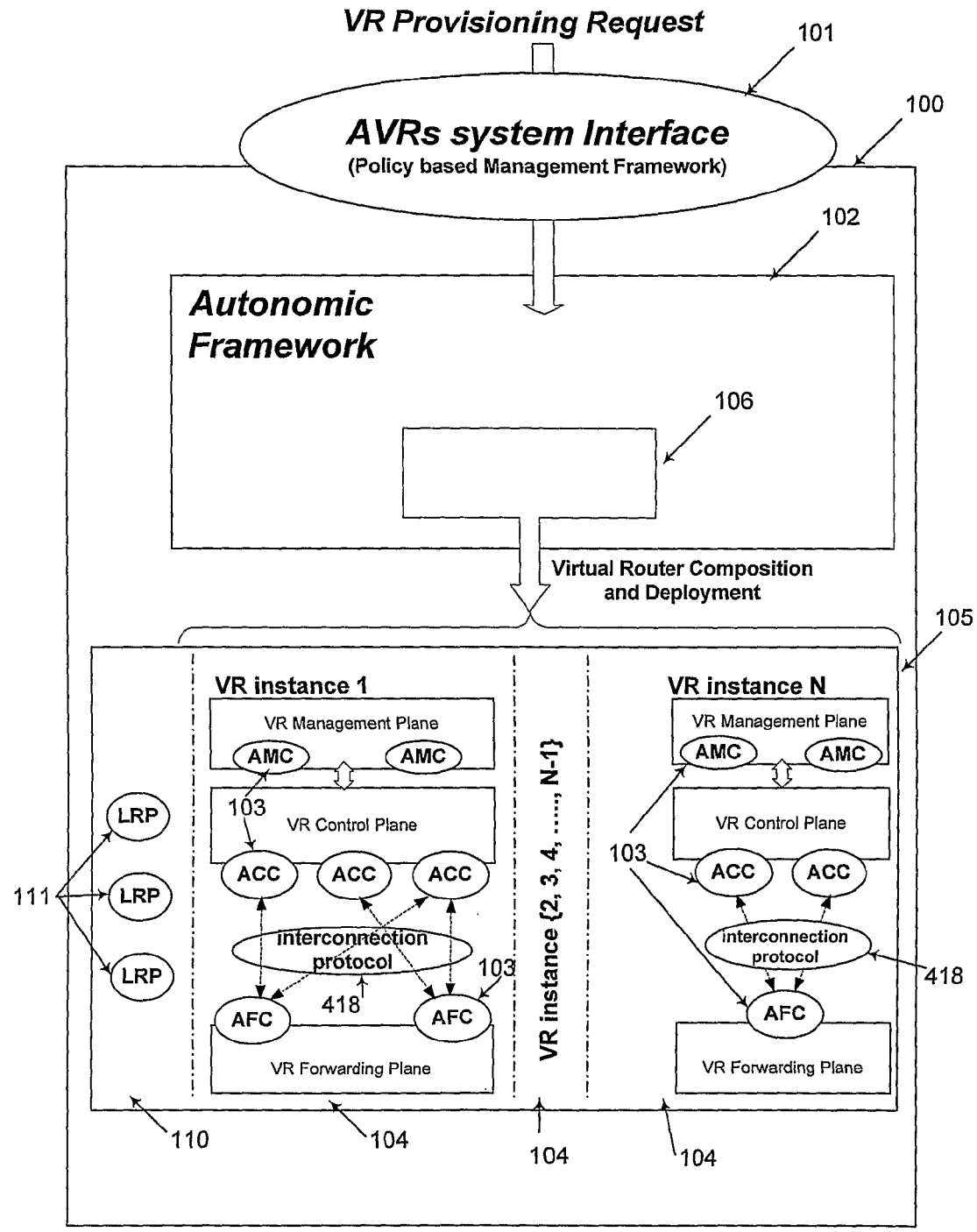
FIG. 2 represents an autonomic network node system providing an example of autonomic virtual routers system of the invention.

FIG. 2 represents a first embodiment of an autonomic network node system of the invention.

The autonomic network node system 100 comprises a system interface 101 used between the autonomic network node system and a VNSP manager, the VNS customer self-service and other network architectures connected to the autonomic network node system of the invention.

The autonomic network node system 100 comprises an autonomic framework 102 that may support the autonomic network node system-level self-management, self-organisation, self-configuration, self-adaptation, self-control, self-deployment, self-healing, self-optimisation and self-protection behaviour. The autonomic framework may support automated provisioning processes of on-demand virtual routing services (VRS) in virtual network service provider (VNSP) edge routers integrating the network node system.

The autonomic network node system 100 also comprises on demand computing environment 105 comprising physical resources 110 divided into logical resources partitions 111 (LRP) and software resources including for example Router Operating Systems or Router Execution Environment. Those resources may handle modular, standardised and autonomic router components (ARCs) 103 communicating via standard mechanisms and protocols 418 and forming multiple virtual router instances 104 supporting the on demand virtual routing services. Each virtual router instance 104 may comprise ARCs which are separated, autonomous, standard and autonomic router components.

In the depicted embodiment, the autonomic framework 102 comprises a database 106 configured for storing network node system information relating to the ARCs 103 and the LRPs 111.

In accordance with the present invention, two automated provisioning processes may be provided:

an "automated provider provisioning virtual routing services process", that may overcome the problem of dynamic deployment of new IP service and reconfiguration of the provisioned routers of a VNS customer described in the "Background of the invention" section and -an "automated customer self-provisioning virtual routing services process", that may overcome the problem of complete self-provisioning, self-control, self-configuration and self-management of the VRs of the VNS customer without any VNSP intervention disclosed above. Following authentication and authorisation procedures imposed by the VNSP, the customer self-service sends directly VR provisioning requests (including new VR installation, VR configurations or VR removal) to the autonomic network node system installed in edge routers.

Figure 3:
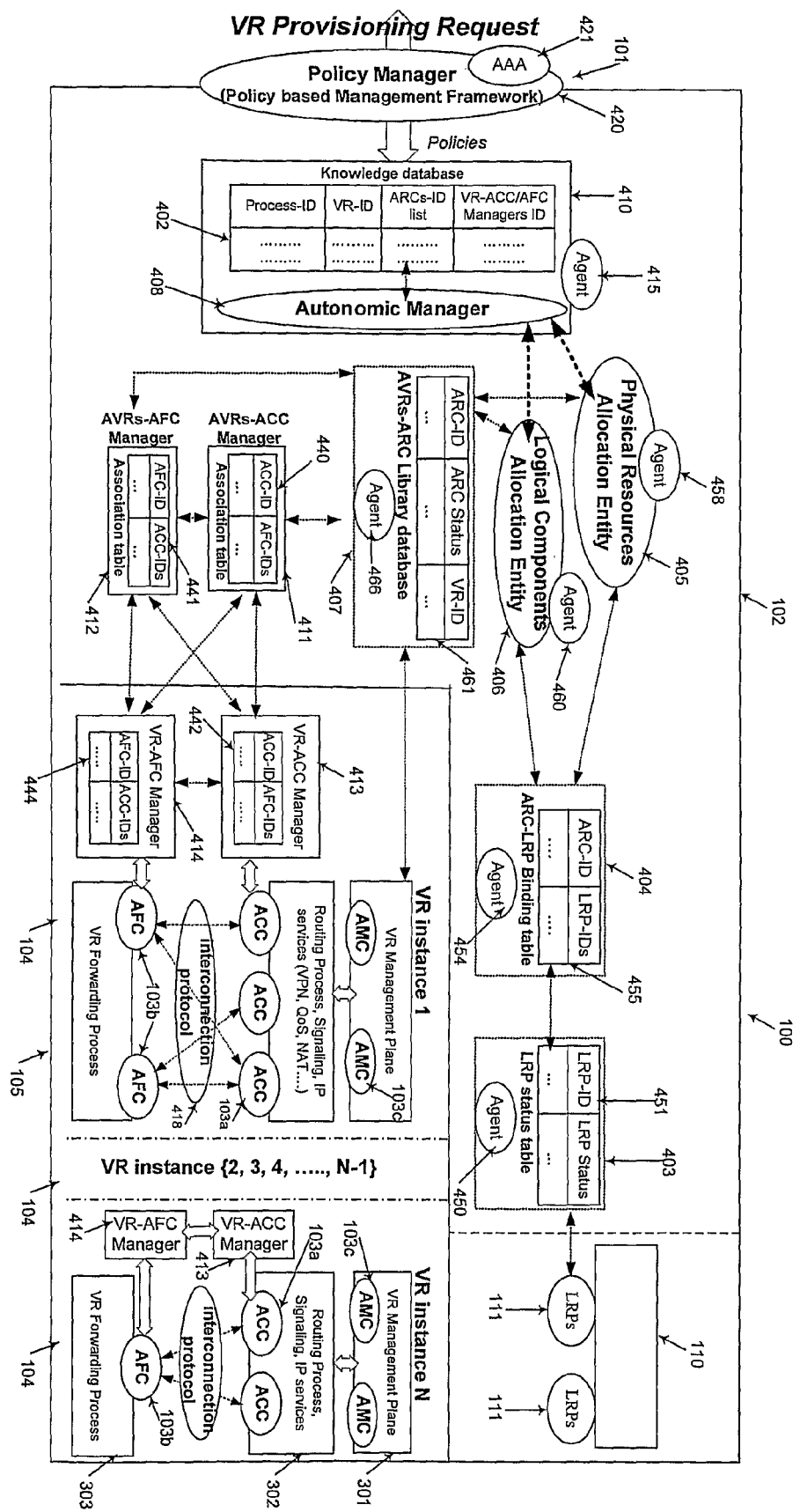
FIG. 3 depicts another embodiment of the autonomic network node system of the invention.

As illustrated in the embodiments of FIG. 3, the autonomic network node system 100 for providing on demand VRs may comprise an AVRs system interface 101 used between the autonomic network node system 100 and the VNSP manager, the VNS customer self-service and other network architectures connected to the autonomic network node system of the invention. The AVRs system interface 101 may integrate a policy based management framework including a "policy manager" 420 responsible for: receiving VR provisioning requests from VNSP manager, VNS customers and other network architectures, analysing the VR provisioning requests and generating policies forwarded to the autonomic framework 102.

The AVRs system interface 101 may also include an AAA 421 (authentication, authorisation and accounting) module responsible for authenticating VNS customers, authorising them to provision VRS and tracking the consumption of router resources by VNS customers.

On demand computing environment 105 may comprise physical and software resources which handle modular, standardised and autonomic router components 103 communicating via standard mechanisms and protocols and forming multiple virtual router instances 104. The ARCs may be self-reconfiguring, self-adapting and self-organising software component capable of dynamically interacting and communicating with other ARCs on the fly and based on standard and well defined input/output ports and interfaces. Each ARC 103 may have a unique identifier called the ARC-ID. The autonomic router components (ARCs) may comprise:

at least one autonomic control component (ACC) 103a,
at least one autonomic forwarding component (AFC) 103b, and
at least one autonomic management component (AMC) 103c.

In a variant not shown, a VR instance may be only composed of a simple routing and forwarding instances and the autonomic router components may only comprise at least one ACC 103a and at least one AFC 103b.

The autonomic framework 102 may support the autonomic network node system-level self-management, self-organisation, self-configuration, self-adaptation, self-control, self-deployment, self-healing, self-optimisation and self-protection behaviour. The autonomic framework 102 may support automated provisioning processes of on demand virtual routing services (VRS) in virtual network service provider (VNSP) edge routers integrating the autonomic network node system.

As depicted in FIG. 3, the autonomic framework 102 may comprise autonomous entities 403, 404, 405, 406, 407 responsible for maintaining, controlling and managing the ARCs, these autonomous entities including:
- at least one logical resource partition (LRP) state entity 403,
- at least one autonomic router component-logical resource partition (ARC-LRP) binding entity 404,
- at least one physical resources allocation entity 405,
- at least one logical components allocation entity 406 and
- at least one AVRs-ARC library entity 407.

Each autonomous entity may comprise an agent 450, 454, 458, 460, 466 responsible for communicating with other autonomous entities, receiving/sending requests and manipulating components running in the autonomous entity.

The autonomic framework 102 may further comprise an autonomic engine 410 that may comprise an "autonomic manager" 408 responsible for receiving policies from the policy manager 420 running in the AVRs system interface 101, analysing policies, making decisions, monitoring operations, executing actions, coordinating and managing the autonomous entities 403, 404, 405, 406, 407 in order to support automated provisioning processes of on demand VRS in VNSP edge routers integrating the autonomic network node system. The autonomic engine 410 may also comprise an agent 415 responsible for communicating with the autonomous entities, receiving/sending requests and manipulating components running in the autonomic engine.

Two states may be considered for an autonomic network node system of the invention:
- initial state: that takes place just after the start up of the autonomic network node system.
- autonomic state: that takes place just after the initial state of the autonomic network node system and is triggered through the autonomic engine.

Figure 4:
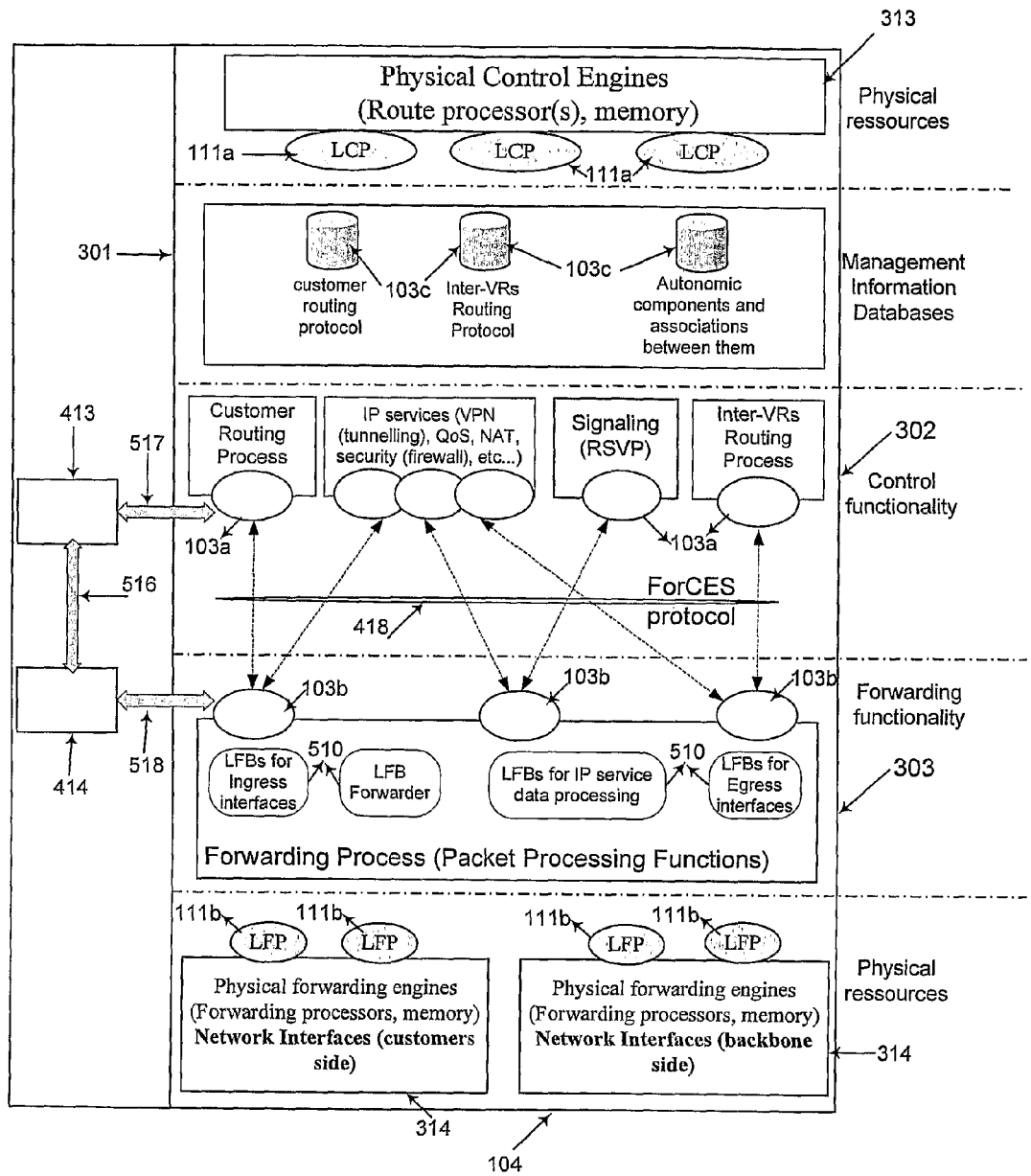
FIG. 4 represents an autonomic network node system in accordance with an example of the invention based on the IETF forwarding and control element separation (ForCES) architecture.

In the physical edge router supporting the autonomic network node system, the physical router resources 110, comprising both physical forwarding engines 314 and physical control engines 313 shown in FIG. 4, may be divided into logical resource partitions (LRPs) 111 called, respectively, logical forwarding partition (LFP) 111b and logical control partition (LCP) 111a. Each logical resources partition (LRP) 111 may comprise a subset of physical resources such as memory, ports constituting the physical i.e. forwarding and control engines. Each LRP 111 (LCP or LFP), has a unique identifier called LRP-ID (LCP-ID or LFP-ID respectively).

The ARCs 103 may be independent from the physical underlying resources and may be installed in different heterogeneous platforms and operating systems. Both ACC 103a and AMC 103c may use the physical underlying resources that may comprise one or multiple physical control engines 313, or one or multiple LCPs 111a. Likewise, an AFC 103b may use the physical underlying resources that may comprise one or multiple physical forwarding engines 314, or one or multiple LFPs 111b. Each VR instance 104 may have its own and dedicated LRPs: LCPs 111a performing ACCs 103a and AMCs 103c of the VR instance, and LFPs 111b performing AFCs 103b of the VR instance.

The LRPs 111 and the ARCs 103 may be forming an on-demand computing environment 105 of the autonomic network node system. The provisioning of on-demand virtual router instances may rely on dynamic allocation, binding and interactions between the LRPs 111 and the ARCs 103.

FIG. 3 depicts an autonomic network node system 100 supporting multiple VR instances 104. Each VR instance may comprise three separated planes, namely a management plane 301, a control plane 302 and a forwarding plane 303. Each VR instance 104 may further comprise a VR-ACC manager 413 and a VR-AFC manager 414. The VR instances 104 design are for example partially based on the disaggregation and router deconstruction concept proposed by the SoftRouter and the ForCES architecture to standardise mechanisms and information exchange between control and forwarding components in the autonomic network node system 100 as disclosed in FIG. 4. The interconnection protocol 418 is for instance the ForCES protocol, as illustrated in FIG. 4. Compared to the ForCES architecture, the invention may help inter ala to improve the functionality of both CE and FE by adding the autonomic aspect to the control and forwarding elements. The invention may also enable to update the interface protocol that interconnects control and forwarding components.

The autonomic control component 103a (ACC) operates in the VR control plane 302. The ACCs perform VR control functionality like VR routing processes such as Inter-VR routing process, customer routing process, backbone routing process. The ACCs 103a also perform signalling protocols such as RSVP and control functionality of IP services such as VPN tunnelling, QoS, security, network address translation (NAT) functions. Each ACC has a unique identifier called ACC-ID.

Using the ForCES terminology, an ACC may be considered as similar to a CE, an AFC to a FE and an AMC to a MIB.

The autonomic forwarding component 103b (AFC) operates in the VR forwarding plane 303. One or multiple AFCs perform the VR forwarding functionality or VR forwarding process. Each AFC 103b has a unique identifier called AFC-ID.

The autonomic management component 103c (AMC) operates in the VR management plane 301. The AMCs 103c handle management information objects and databases (e.g. management information base (MIB) module objects) responsible for maintaining management information for routing protocols, tunnelling, router interfaces and interactions between control and forwarding components inside the VR.

Still with the ForCES terminology, the CE manager and the FE manager may be considered as similar to the AVRs-ACC manager 411 and AVRs-AFC manager 412 of the autonomic network node system 100. Still with the ForCES terminology and in alternative embodiments, the CE manager and the FE manager may be considered as similar to the VRs-ACC manager 413 and VRs-AFC manager 414 of a VR instance 104.

The AVRs-ACC manager 411 may maintain a list of ACCs performing the autonomic network node system and may be responsible for an AFC discovery process by determining with which AFC(s) an ACC 103a should communicate within the autonomic network node system. The AFC discovery process, achieved via the dynamic binding protocol, provides the capabilities of AFCs 103b available in the autonomic network node system. The AVRs-ACC 411 manager may include an association table 440 maintaining association between an ACC 103a identifier and the appropriate AFCs identifiers and capabilities associated to this ACC, within the autonomic network node system.

The AVRs-AFC manager 412 may maintain the list of AFCs 103b performing the autonomic network node system and may be responsible for the ACC discovery process by determining with which ACC(s) an AFC should communicate within the autonomic network node system. The ACC discovery process, achieved via the dynamic binding protocol, may provide the capabilities of ACCs available in the autonomic network node system 100. The AVRs-AFC manager 412 may include an association table 441 maintaining association between an AFC identifier and the appropriate ACCs identifiers and capabilities associated to this AFC 103b, within the autonomic network node system.

The AVRs-ACC 411 and AVRs-AFC 412 managers are the main managers of the autonomic network node system. In addition to these managers, the invention may also provide child managers.

The VR-ACC manager 413 is a child manager of the AVRs-ACC manager 411. The VR-ACC manager 413 may maintain the list of ACCs 103a performing the VR control plane and be responsible for the AFC discovery process by determining with which AFC(s) 103b an ACC 103a should communicate within one VR instance 104. The AFC discovery process, achieved via the dynamic binding protocol, provides the capabilities of AFCs available in the autonomic network node system. The VR-ACC manager 413 includes an association table 442 maintaining association between an ACC identifier and the appropriate AFCs identifiers and capabilities associated to this ACC 103a, within the VR instance 104.

The VR-AFC manager 414 is a child manager of the AVRs-AFC manager 412. The VR-ACC manager 413 may maintain the list of AFCs 103b performing the VR forwarding plane and be responsible for the ACC discovery process by determining with which ACC(s) an AFC 103b should communicate within the VR instance 104. The ACC discovery process, achieved via the dynamic binding protocol, provides the capabilities of ACCs available in the autonomic network node system. The VR-AFC manager 414 may include an association table 444 maintaining association between an AFC identifier and the appropriate ACCs identifiers and capabilities associated to this AFC 103b, within the VR instance 104.

The information exchange between the AVRs-ACC 411 and AVRs-AFC 412 managers via a binding protocol being for example a dynamic binding protocol described in the embodiment may be different from the information exchange between the VR-ACC/AFC managers 413 and 414 and the AVRs-ACC/AFC managers 411 and 412. Indeed, both the AVRs-ACC manager and the AVRs-AFC manager may maintain general associations including all available and compatible ACCs 103a and AFCs 103b including: shared AFCs which means used by other ACCs, shared ACCs which means used by other AFCs 103b, duplicated ACCs and AFCs 103b functionality in the same association.

However, both the VR-ACC manager 413 and the VR-AFC manager 414 may maintain specific associations between ACCs and AFCs that are neither duplicated nor shared ACCs 103a and AFCs 103b and that will finally communicate within the VR instance 104. Hence, additional mechanisms may be needed for the dynamic binding protocol to filter shared and duplicated ACC 103a and AFC 103b during the discovery process between main and child managers.

FIG. 4 depicts an embodiment of a VR instance design 104 composed of autonomic router components ARCs 103 (ACCs 103a, AFCs 103b, AMCs 103c), a VR-ACC manager 413, a VR-AFC manager 414, dynamic binding protocol 516 (for example SoftRouter binding protocol) and the ForCES protocol 418 used as a transport protocol between ACCs 103a and AFCs 103b. The VR-ACC Manager may inform the ACCs via a binding protocol 517 of the association decisions made during the pre-association phase.

The VR-AFC Manager may inform the AFCs, via a binding protocol 518 of the association decisions made during the pre-association phase.

The ForCES working group is currently specifying the FE model [Yang, L., et al. "ForCES forwarding element model", Internet draft, April 2004.] to define the information exchanged between the CE and the FE in the ForCES protocol. The FE model describes the logical processing functions of an FE i.e. an AFC 103b, called LFBs 510 (logical function block). The LFBs 510 represent basic building blocks in an FE. The FE model may include three components:

the LFB model models the content and structure of individual logical functional block (LFB). By using the LFB model, it is possible to configure the attributes of each LFB 510 and possibly enable dynamic extensions of the router data path behaviour using LFB class libraries. The LFB class libraries define templates representing packet processing operation in the VR data path, the LFB topology (or Intra-FE topology): logical interconnection between LFBs along the datapath within an FE, i.e. without an AFC 103b, the FE level attributes, including the FE capabilities (like attributes, values, name, functionality, . . . ).

In the embodiment of FIG. 4, multiple AFCs 103b may be controlled by multiple ACCs 103a via the ForCES protocol 418. It does not go beyond the invention when only one AFC 103b is used to achieve the entire VR forwarding process. Multiple AFCs 103b may also be involved to handle the entire VR forwarding process, for instance, when one AFC 103b attached to the customer network interfaces requires to send IP packets to another AFC attached to the backbone network interfaces and vice versa.

Each AFC 103b may include multiple LFBs 510 connected to each other to form the LFB topology. FIG. 4 shows one example of an inter-AFC connections handling the VR forwarding process, in which each AFC 103b maintains a set of LFBs 510 needed to achieve the packet processing in the VR. An AFC 103b may maintain a set of LFBs used by one VR instance 104, may be shared by other VR instances 104 which can use the available set of LFBs in the AFC 103b.

As illustrated in FIG. 4, the packet processing in the VR data plane is achieved via multiple LFBs 510 including: LFB forwarder used to support the VR forwarding table (FIB), LFBs performing packet processing for IP services like for instance LFBs for tunnelling (such as LFB IPsec encapsulation), LFBs for QoS (such as LFB meter, LFB classifier, LFB shaper), etc. . . . ).

Dedicated LFBs may also be used for both ingress and egress physical/logical network interfaces and ports of the VR.

The ACCs 103a that perform the inter-VR routing process and the customer routing process may communicate and synchronise their routing tables (RIBs) to an identical replicate routing table which interacts with the forwarding table (FIB) handled by the AFC forwarder.

FIG. 4 also represents an example of a management plane 301 of a VR: Multiple management information databases that are in this embodiment management information base (MIB) module objects handled by AMCs 103c, are used to maintain routing protocol MIB tables, tunnel MIB tables, QoS MIB tables, router interfaces MIB table (physical and logical interfaces bound to VRs identifiers), association MIB tables, etc.

The association MIB table may maintain the ACCs 103a and AFCs 103b identifiers, capabilities and associations between them during the VR post-association phase. All management information base (MIB) module objects, integrating the AMCs 103c, may interact to synchronise and update their management information and data (e.g. VR-ID, interfaces, routing, tunnelling, etc).

The use of a standard architecture (such as ForCES architecture) to design a VR instance 104 may provide standard mechanisms and allow VR control functionalities and VR forwarding functionalities to become standard components that are physically separated. This advantage may be of importance to allow customer self-service to automatically self-provision, self-control and self-configure their VRs installed in the VNSP edge routers. Indeed, the VNS customer, following authentication and authorisation procedures imposed by the VNSP, may install remotely their control and routing functionality by demanding, allocating or installing standardised ACCs 103a in the provider edge routers. These ACCs 103a may communicate with the AFCs 103b already installed in the edge router since the standard transport protocol, such as for example ForCES protocol, may ensure the communication between them in an interoperable, flexible, standard and reliable manner. The skilled man may refer to the "network processing forum" available at: http://www.np-forum.org/, which provides a set of standard interfaces and application program interfaces (APIs) allowing control functionality to be completely independent from the forwarding functionality implementation.

Once, the VR 104 instance is installed, the VNS customer self-service may self-configure and self-manage its VR routing and forwarding.

The autonomic framework 102 depicted in FIG. 3 may provide to the autonomic network node system 100 the following capabilities:

- self-awareness: the autonomic network node system may need detailed knowledge of its state, components, and behaviours and should be aware of its logical and physical resources that can be shared, isolated, allocated or borrowed. The autonomic network node system may monitor, maintain and adjust its operation, resources and components during virtual routing service provisioning,
- self-organising: the autonomic network node system may need an organiser which is in the embodiment described the autonomic manager 408, to coordinate and orchestrate the autonomic router components and autonomous entities forming the system,
- self-configuration: the autonomic network node system may be able to configure and reconfigure itself automatically following unpredictable deployment and provisioning requests and external conditions,
- self-optimising: the autonomic network node system may seek ways to optimise itself to improve its execution and to ensure that the system is running at optimum levels,
- self-healing: the autonomic network node system may discover and repair localised problems, resulting from bugs or failures in software and hardware, to ensure that the system runs smoothly (if an ARC 103, constituting a VR instance 104, fails during the VR execution, the autonomic engine 410 may manage to allocate a backup ARC 103 from the AVRs-ARC library entity 407 to replace the failed ARC (self-healing concept)),
- self-protecting: the autonomic network node system 100 may be capable of identifying, detecting and protecting its resources from malicious attacks and inadvertent cascading failures. The autonomic network node system should maintain overall system security and integrity.

For definition of some previously-mentioned terms, the skilled man may refer to the article: P. Horn. autonomic computing: IBM's perspective on the state of information technology. http://www.research.ibm.com/autonomic/, October 2001. IBM Corp.

An aim of the autonomic framework 102 may be to build an autonomic network node system that is capable of self-managing and self-adapting automatically the router components and their interactions during automated provisioning processes (self-configuring), discovering, reacting to disruptions and restarting failed components and entities (self-healing), optimising and tuning resources automatically (self-optimising), detecting, identifying and protecting themselves from internal and external attacks (self-protecting).

FIG. 3 depicts an autonomous entity called logical resource partition (LRP) state entity 403 composed of an agent 450 and a table, called LRP status table 451, responsible for maintaining the LRPs 111 involved in the set up of management, control and forwarding planes of all VR instances 104. Each entry of the LRP status table 451 may comprise of the LRP identifier and the LRP status: "allocated" or "ready" status.

During the initial state of the autonomic network node system, a binding between the ARCs 103 (AMCs, ACCs, AFCs) on the one hand, and physical (control and forwarding) engines including LRPs 111 on the other hand, may be defined and assigned by AVRs managers.

As depicted in FIG. 3, an autonomous entity called ARC-LRP binding entity 404 may be defined in the autonomic network node system 100 as a logical entity maintaining the binding between ARCs 103 and LRPs 111.

The ARC-LRP binding entity may comprise an agent 454 and a table 455, called ARC-LRP binding table 455, in which each entry is composed of the ARC 103 identifier (ARC-ID) and the identifiers of LRP(s) 111 performing the ARC 103. The ARC-LRP binding entity 404 and the LRP state entity 403 interact, via their agents 450 and 454, to synchronise their contents. The LRPs 111 already used in the ARC-LRP binding table 455, are stated as "allocated" in the LRP status table 451. The other LRPs, which are not performing ARCs in the ARC-LRP binding table, are stated as "ready" in the LRP status table.

The ARC-LRP binding table 455 of the ARC-LRP binding entity 404 may maintain a pool of ARCs 103 already bound and associated to LRPs 111 that are thus stated as "allocated" in the LRP status table 451. These ARCs 103 may be ready for any further allocation procedure conducted by the logical components allocation entity 406 and authorised in the autonomic network node system during the autonomic state.

The LRP state entity 403 may maintain a pool of LRPs 111 stated as "ready" in the LRP status table 451 available to install new ARCs 103 by customers self-service or VNSP manager in the ARC-LRP binding entity 404 conducted by the physical resources allocation entity 405 during the autonomic state.

The physical resources 110 may be dynamically partitioned and assigned to perform the ARCs at run time. In this case, the ARC-LRP binding table should be updated dynamically based on the dynamic resources partition.

Figure 5:
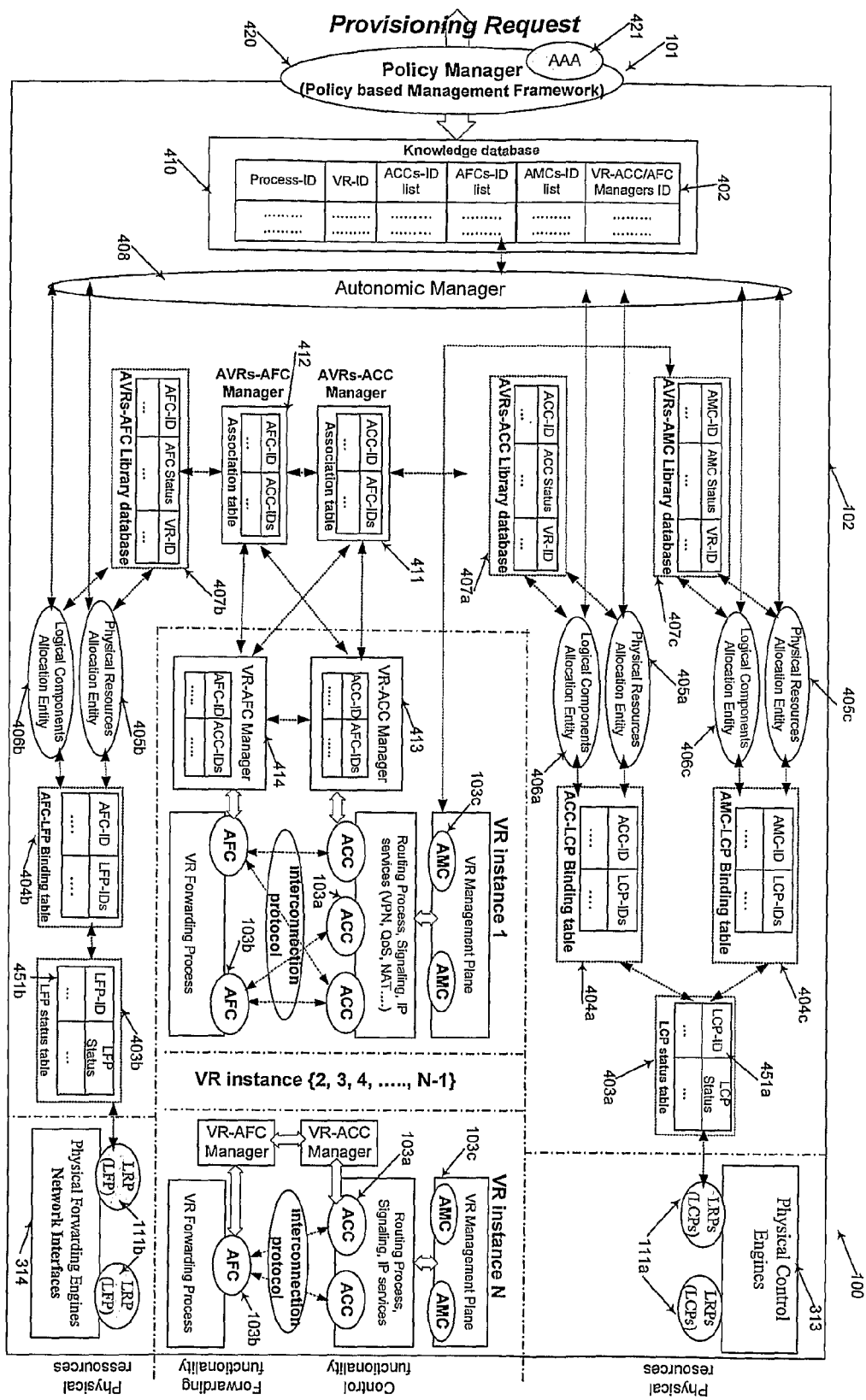
FIG. 5 is a more detailed view of the embodiment of FIG. 3.

FIG. 5 depicts an example of two LRP state entity instances: LCP state entity 403a instance and LFP state entity instance 403b related to the LCPs 111a and LFPs 111b, respectively, located in the autonomic network node system 100. Three ARC-LRP binding entity instances are also depicted in FIG. 5: AMC-LCP binding entity 404c, ACC-LCP binding entity 404a and AFC-LFP binding entity 404b related to the three kinds of ARCs: AMC 103c, ACC 103a and AFC 103b, respectively.

FIG. 3 depicts an autonomous entity called AVRs-ARC library entity 407 that represents a logical entity that maintains all ARCs 103 available in the autonomic network node system 100. The AVRs-ARC library entity 407 is composed of an agent 466 and a AVRs-ARC library database 461. Each entry in the database 461 is composed of an ARC identifier, the status of this ARC being for instance "ready", "allocated" or "new", and the identifier of the VR 104 integrating the ARC 103.

FIG. 5 depicts an example of three AVRs-ARC library entity instances: AVRs-AMC library entity instance 407c, AVRs-ACC library entity instance 407a and AVRs-AFC library entity instance 407b related to the AMC 103c, ACC 103a and AFC 103b components, respectively.

FIG. 3 also depicts an autonomous entity called physical resources allocation entity 405 that comprises an agent 458 and that represents a logical entity responsible for allocating LRPs 111 from the ARC-LRP binding entity 404, these LRPs being stated as "ready" in the LRP status table 451a and available to install new ARCs by customers self-service or VNSP manager in the autonomic network node system 100 during the autonomic state. Once LRPs 111 are successfully allocated to execute the new required ARC, these LRPs 111 are stated as "allocated" in the LRP status table 451 and the physical resources allocation entity 405 installs the new ARC in the autonomic network node system 100, creates a ARC-ID for the new ARC 103 in the ARC-LRP binding table 455 and, finally, transfers the ARC-ID to the AVRs-ARC library entity 407 with ARC status marked as "new".

FIG. 3 also depicts an autonomous entity called logical components allocation entity 406 that represents a logical entity responsible for allocating ARCs during both initial and autonomic states. The logical components allocation entity may comprise an agent 460 and may operate during the initial state to transfer all ARCs from the ARC-LRP binding entity 404 to the AVRs-ARC library entity 407 and to mark the status of these ARCs as "ready". The logical components allocation entity may operate also during the autonomic state to allocate ARCs in "ready" status from the AVRs-ARC library entity following the allocation procedure conducted by the autonomic engine 410 and authorised in the autonomic network node system. Once ARCs are allocated, they are defined as "allocated" in the AVRs-ARC library database 461. As shown in FIG. 5 three physical resources allocation entity instances 405c, 405a and 405b and three logical components allocation entity instances 406c, 406a and 406b may be used between the AVRs-ARC library entities 407c, 407a and 407b and the ARC-LRP binding entities related respectively to the AMCs 103c, ACCs 103a and AFCs 103b components.

As depicted in FIG. 3, the AVRs-ARC library entity 407 may interact with the AVRs-ACC manager 411 and the AVRs-AFC manager 412 in case the ARC component is related to the ACC 103a and AFC 103b components, respectively. The AVRs-ARC library entity 407 interacts with the VR management plane 301 of the VR instances 104 in case the ARC 103 component is related to the AMC component 103c.

FIG. 5 illustrates in more details the interaction between the AVRs-ACC library entity instance 407a and the AVRs-ACC manager 411, the interaction between the AVRs-AFC library entity instance 407b and the AVRs-AFC manager 412 and interaction between the AVRs-AMC library entity instance 407c and the VR management planes 301.

As depicted in FIG. 3, the autonomic engine 410 may be the main component in the autonomic framework 102 operating in the autonomic state. As depicted in FIG. 3, the autonomic engine 410 may comprise an autonomic manager 408 responsible for receiving policies from the policy manager 420 running in the AVRs system interface 101, analysing policies, making decisions, executing actions, coordinating and managing the autonomous entities, and a table called knowledge database 402 maintaining entries comprising:

process ID: representing a unique identifier composed of: the customer or VNSP identifier, the membership identifier (in case the customer has multiple VRS supported by multiple VRs in the same edge router) and the process type information of the automated provisioning process that can be either: automated provider provisioning virtual routing services process if the VR provisioning requests are sent from VNSP manager or automated customer self-provisioning virtual routing services process if the VR provisioning requests are sent from customers self-service.

VR-ID which is a unique identifier of the VR instance installed in the autonomic network node system, ARCs-ID list which includes the lists of all ARCs 103 identifier involved in the VR instance 104. The ARCs-ID is composed of three sub-lists (see FIG. 5): the AMCs-ID list, ACCs-ID list and AFCs-ID list, VR-ACC manager-ID which is a unique identifier of the VR-ACC manager entity 413 associated to the VR instance 104, VR-AFC manager-ID which is a unique identifier of the VR-AFC manager entity 414 associated to the VR instance.

The AVRs system interface 101 may receive all VR provisioning requests representing business-level objectives and goals from the VNSP manager, from the customer self-service and from other VR systems during the autonomic state. Once the authentication and authorisation procedures are achieved by the AAA module 421, the policy manager 420 may analyse the VR provisioning requests, generate policies and rules and forward them to the autonomic engine 410. The autonomic manager 408, running in the autonomic engine, may self-organise and co-ordinate interactions between the autonomous entities in the autonomic framework to support the required automated provisioning process.

The VR provisioning request may deal with the AVRs system interface 101 that is used between the autonomic network node system itself and the VNSP, the VNS customer self-service and the other VR systems connected to the autonomic network node system. The AVRs system interface 101 may receive VR provisioning requests in the following format: [header: [request identifier] [request object ("VR creation", "value added service deployment in VR", "VR configuration", "VR removal")] [allocation process]] [data: [VR creation information], [service deployment information], [VR configuration information], [ARCs code]].

The components of a received request are now described.

The request identifier may represent a unique identifier composed of the customer or VNSP identifier, the membership identifier and the process type information of the automated provisioning process. The request identifier is the same as the process-ID defined in the knowledge database 402.

The request object may provide the object of the request:
the "VR creation" object creates a VR instance for the customer if no VR instance is already installed in the autonomic network node system,
the "VR configuration" object configures and changes ARCs 103 (AMCs, ACCc, AFCs) components in a VR instance already installed in the autonomic network node system,
the "VR removal" object removes a VR instance 104 already installed in the autonomic network node system,
the "value added service deployment in VR" object informs about the need of deploying new services (like VPN, QoS) in the already created VR instance 104.

The allocation process may comprise two allocation processes distinguished according to the provisioning request related to the "VR creation" object, "Value added service deployment in VR" object and "VR configuration" object (configurations concerning only the case of complete change of ARCs):
- a logical components allocation process when the VNSP manager or the customer self-service needs to allocate ARCs components available in the autonomic network node system. The autonomic manager 408, based on the data part of the provisioning request, allocates the required ARCs from the AVRs-ARC library entity 407 via the logical components allocation entity 406.
- a physical resources allocation process when the VNSP manager or the customer self-service needs to allocate LRPs being LCPs and/or LFPs to install their own ARCs in the autonomic network node system. The data part of the provisioning request handles the ARCs software codes. The autonomic manager 408 may allocate the required LRPs 111 from the ARC-LRP binding entity 404, via the physical resources allocation entity 405, to install the ARCs software codes.

The "VR creation" information is related to the "VR creation" object and to the logical components allocation process and provides parameters and capabilities information such as routing protocols type needed for the VR instance creation. Based on the VR creation data information, the autonomic manager 408 may allocate, if possible, the required ARCs available in the autonomic network node system to create the VR instance 104.

The "service deployment" information is related to the "value added service deployment" in VR object and provides parameters and capabilities information such as tunnelling type needed for the service creation and deployment in the VR. Based on the service deployment data information, the autonomic manager 408 may allocate, if possible, the required ARCs available in the autonomic network node system to create the service components and deploy them in the VR.

The "VR configuration" information is related to the "VR configuration" object and provides information about updates, changes and modifications of already created VRs. Based on the VR configuration data information, the autonomic manager 408 may update, modify or change the appropriate ARCs constituting an already created VR instance.

The ARCs codes are related to the physical resources allocation process. Software codes for ARCs 103, i.e. AMC code, ACC code, AFC code are completely included in the VR provisioning request.

The autonomic manager 408 may be responsible for self-installing the software codes in the autonomic network node system for VR creation, configuration or service creation and deployment.

An autonomic network node system of the invention may maintain initially a bank of multiple ARCs 103 maintained by the AVRs-ARC library entity 407 (routing instances (like OSPF, RIP, BGP), signalling protocols and control functionalities, packet processing functions (VR forwarding, packet encapsulation), etc. The modular architecture of the separated control and forwarding planes based on standard framework such as the IETF ForCES architecture may provide the flexibility, simplicity and reliability to create and provision automatically VR instances by defining dynamically the appropriate set of AMCs 103c, ACCs 103a and AFCs 103b capabilities needed to create a VR instance 104. The definition of the set of ARCs to create and provision the VR instance or IP services deployment in the VR instance may be based on the customer-specific information (for instance: customer requires BGP protocol for Inter-VR routing process, OSPF protocol for customer routing process, RSVP for signalling, etc. . . . ). The autonomic network node system, also, may maintain initially a bank of multiple LRPs 111 (LCPs 111a and LFPs 111b) ready to handle standard ARCs 103 software code further installed in the edge router. These added logical entities may communicate with the ARCs already installed in the autonomic network node system, via a transport protocol such as (the ForCES protocol) in a reliable and interoperable manner.

Figure 6:
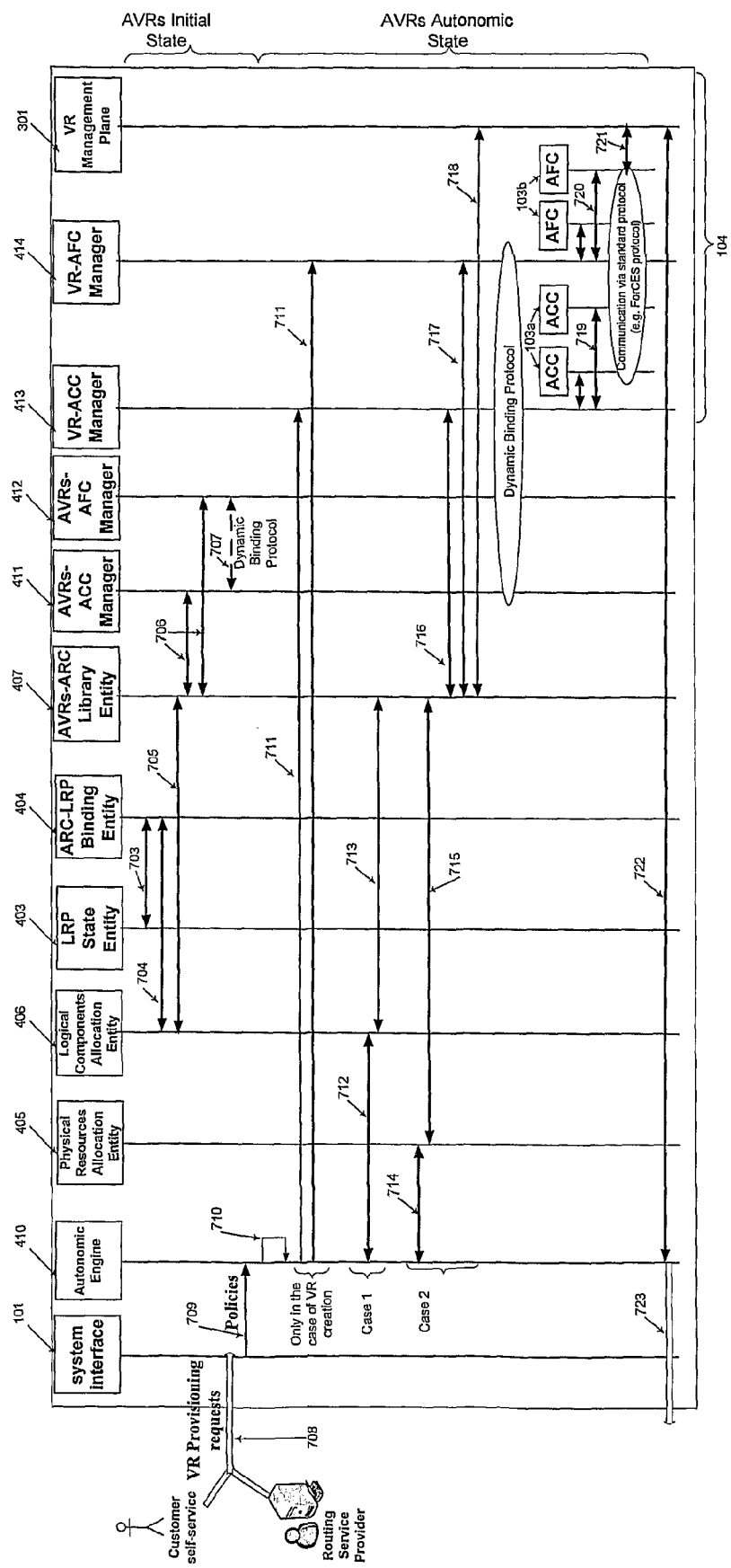
FIG. 6 is a scenario illustrating the self-organising autonomic network node system to support automated provisioning virtual routing services processes.

To understand better the autonomic and self-organising aspect of the autonomic network node system 100, FIG. 6 provides a step by step diagram scenario illustrating an example of self-interaction between the autonomic engine and autonomous entities to support both "automated provider provisioning virtual routing services" and automated self-provisioning virtual routing services processes.

During the initial state of the autonomic network node system, the following steps may be performed:
- the interaction between the LRP state entity 403 and the ARC-LRP binding entity 404 are started automatically at step 703 via their agents 450 and 454. A pool of ARCs 103 is provided, these ARCs being assigned to LRPs 111 in "allocated" status. A pool of LRPs 111, in "ready" status, is also provided and available to perform new ARCs installed during the autonomic state by customers self-service or VNSP manager in the autonomic network node system,
- the logical components allocation entity 406 interacts at step 704 with the ARC-LRP binding entity 404 to retrieve all ARCs available in the autonomic network node system. The logical components allocation entity 406 transfers then, at step 705, all ARCs from the ARC-LRP binding entity 404 to the AVRs-ARC library entity 407 with ARC status marked as "ready",
- next, the AVRs-ACC library entity instance 407a and the AVRs-AFC library entity instance 407b interact at step 706 with the AVRs-ACC manager 411 and the AVRs-AFC manager 412, respectively, to exchange ACCs 103a and AFCs 103b in "ready" status. The AVRs-ACC manager 411 and the AVRs-AFC manager 412 communicate at step 707 via the dynamic binding protocol to discover, associate and exchange ACCs 103a and AFCs 103b capability information.

Once the initial state is achieved, the autonomic network node system is ready to receive VR provisioning requests from VNSP manager and VNS customer self-service to enable automated provisioning processes: the autonomic network node system is now in the autonomic state.

Concerning the automated provider provisioning virtual routing services process, when the VNS customer self-service is attached to a physical edge router, an on demand virtual routing service request is sent to the VNSP managing the edge router. The customer uses a static or dynamic identifier (e.g. login and password) to be authenticated by using for example the AAA module 421 included in the AVRs system interface 101 and to open a session with the VNSP (management identity phase). Once authenticated, the customer sends a VR provisioning request to the VNSP that plays the role of mediator that only checks, bills, and forwards the customer requests at step 708 to the autonomic network node system, more precisely to the AVRs system interface 101.

Concerning the automated self-provisioning virtual routing services process, when customer self-service is attached to a physical edge router, an on demand virtual routing service request is sent directly to the AVRs system interface 101 in the autonomic network node system. In this case, the VNSP does not intervene to provision the customer request to the autonomic network node system. The customer self-service uses a static or dynamic identifier (e.g. login and password) to be authenticated by using for example the AAA module 421 included in the AVRs system interface 101 and to open a session with the autonomic network node system (management identity phase). Once authenticated and authorised by the AAA module 421 included in the autonomic network node system interface which maintains the list of all customer identifiers, the customer sends at step 708 a VR provisioning request directly to the autonomic network node system. Based on the customer-specific information included in provisioning requests, VR provisioning is achieved by the autonomic network node system itself without the intervention of the VNSP to manually provision the VRS parameters such as protocols, software routing processes, etc required by the customer.

During the autonomic state, the following steps may be performed:

the AVRs system interface 101 receives at step 708 VR provisioning requests from both the VNSP manager and VNS customers self-service. All VR provisioning requests must respect the AVRs system interface 101 defined in this description, the policy manager 420, included in the autonomic network node system, analyses the VR provisioning request fields, generates policies and forwards them at step 709 to the autonomic engine 410. The autonomic engine 410 analyses at step 710 the policies and determines, first, the "request identifier" information. If the "request identifier" does not already exist in the knowledge database 402 (in the case of "VR creation" object), a new entry is added related to the new "request identifier" (process-ID=request identifier). If the "request identifier" exists in the knowledge database 402 (process-IDs), the VR provisioning request will be assigned to the entry "process-ID" handling the "request identifier".

The autonomic engine 410 may retrieve next the request object which may be "VR creation", "VR configuration", "VR removal" or "service deployment" and may self-organise and co-ordinate the interactions between the autonomous entities to support the required VR provisioning:

if the request object is related to the "VR creation" object, the autonomic engine may create a new VR identifier and add it in the knowledge database 402. Next, the autonomic engine may create at run time at step 711a new VR-ACC manager 413 and a new VR-AFC manager 414 for the new VR control and forwarding planes. The autonomic engine 410 creates new VR-ACC manager and VR-AFC manager identifiers and adds them to the knowledge database 402, if the request object is related to the "VR creation" object, "value added service deployment in VR" object and "VR configuration" object (configurations concerning only the case of complete change of ACCs and AFCs), the autonomic engine 410 may have to distinguish, based on the allocation process field included in the request, between allocation processes: logical components allocation process or physical resources allocation process.

In a first case, if the allocation process is related to a logical components allocation process, the following steps may be performed:

the autonomic engine 410 retrieves the data information included in the provisioning request ([VR creation information], [service deployment information] or [VR configuration information]) and interacts at step 712 with the logical components allocation entity 406 to allocate the required ARCs 103 from the AVRs-ARC library entity 407. The request sent from the autonomic engine 410 to the logical components allocation entity 406 includes the identifier of the required VR (VR-ID), once the ARCs are allocated by the logical components allocation entity 406, there status may be marked as "allocated" and assigned to the appropriate VR-ID in the AVRs-ARC library database 461, the AVRs-AMC library entity instance 407c sends at step 718 the list of allocated AMCs 103c to the VR management plane 301.

In a second case, if the request object is related to a physical resources allocation process, the following steps may be performed:

the autonomic engine 410 retrieves the ARCs software codes included in the data part of the provisioning request ([ARCs code]). The autonomic engine allocates at step 714, via the physical resources allocation entity 405, the required LRPs 111 in "ready" status from the LRP state entity to install the ARCs software codes, once the LRPs are successfully allocated to perform the new ARCs, they will be stated as "allocated" in the LRP status table. The physical resources allocation entity 405 creates new identifiers for the new ARCs 103 and add them at step 715 to the AVRs-ARC library database associated to the VR-ID, the new ARCs are in "new" status, the AVRs-ACC and/or AVRs-AFC library entity instances 407a and/or 407b send (at steps 716, 717) the list of new ACCs and/or AFCs identifiers associated to the VR-ID to the VR-ACC manager 4130 and/or VR-AFC manager 414, respectively. The AVRs-AMC library entity instance 407c sends at step 718 the list of new AMCs to the VR management plane 301.

If the request object is related to the "VR removal" object, the entry related to the process-ID specified in the provisioning request may be removed entirely from the knowledge database 402. The autonomic engine 410 may, then, free all ARCs 103 allocated to the VRs and update the AVRs autonomous entities.

The autonomic engine may trigger the dynamic binding protocol for communication between the AVRs-ACC library 407a, AVRs-AFC library 407b, VR-ACC manager 413 and VR-AFC manager 414 entities to exchange and decide which ACCs 103a and AFCs 103b will finally form the VR or the IP service deployed in the VR.

Next, the final and specific list of ARCs identifiers constituting the VR instance may be sent to the autonomic engine 410 to complete the knowledge database 402.

The VR-ACC manager 413 may activate, next, the allocated ACCs 103a and inform at step 719 them of the association list of AFC(s) that they may communicate with inside the VR. Likewise, the VR-AFC manager 414 may activate the AFCs 103b and inform at step 720 them of the association list of ACC(s) that they may communicate with inside the VR.

A standard protocol such as the ForCES protocol may interconnect automatically the ACCs 103a and AFCs 103b inside the VR instance 104 and update at step 721 the MIB tables, handled by AMCs 103c, in the VR management plane 301. All MIB tables may also be synchronised to form the whole VR information (VR-ID, interfaces, routing, tunnelling, etc). Management information may be exchanged at step 722 between the AMCs 103c, in the VR management plane, and the autonomic engine to enable the VNSP manager or customer self-service to further manage, monitor and maintain the VR if the need arises. A notification request may be sent at step 723 to the VNSP or the VNS customer to inform about successful creation of the VR.

The number of VR instances 104 limitation may be related to the availability of ARCs 103 in the autonomic network node system 100 and then to the LRPs 111 being LCPs and LFPs physical resources. The number of LCPs may be increased by having multiple physical control engines in the edge routers. The number of LFPs may be increased by having multiple physical forwarding engines in the edge routers. In the case when the physical forwarding engines are installed in line cards, autonomic network node system based on fourth generation edge router architecture may be needed to install multiple line cards integrating physical forwarding engines. Indeed, the fourth generation edge router architecture may comprise multiple boxes connected through a high speed network. Each box may maintain a fixed and limited number of line cards. In order to increase the number of line cards in the edge router, the manufacturer may simply add new boxes to the edge router. An autonomic network node system based on standard architecture such as for example ForCES architecture may be able to ensure the interconnection between ACCs 103a and AFCs 103b that are physically separated. Once the new physical forwarding engines are added, the ARC-LRP binding entity 403 maintained by the autonomic network node system may be updated by the new LRPs 111. The autonomic network node system installed in the fourth generation edge router architecture may provide good scalability in terms of number of VR instances that the physical edge router can support.

PROPOSED EXAMPLE

This section presents an example of an autonomic network node system that maintains initially a bank of multiple ARCs 103 (38 ARCs) running on multiple separated LRPs:
  10 ACCs: 5 ACCs OSPF, 3 ACCs BGP, 2 ACCs RSVP.
  8 AMCs: 4 AMCs COPS and 4 AMCs SNMP.
  20 AFCs: 4 AFCs classifier, 4 AFCs forwarder, 4 AFCs scheduler, 4 AFCs QoS, 4 AFCs IPsec.

In order to simplify the example, it as assumed that the initial state of the autonomic network node system has already been achieved. The AVRs-AMC library entity instance 407c maintains the 8 AMCs whose status is "ready", the AVRs-ACC library entity instance 407a maintains the 10 ACCs whose status is "ready". The AVRs-AFC library entity instance 407b maintains the 20 AFCs whose status is "ready". The AVRs-ACC manager 411 and the AVRs-AFC manager 412 have already exchanged ACCs and AFCs capability information.

The autonomic network node system is now in the autonomic state and ready to receive VR provisioning requests. In this example, it is focused on the automated self-provisioning virtual routing services process. Once the customer self-service is authenticated and authorised by the AAA module 421 included in the AVRs system interface 101, the customer sends a VR provisioning request directly to AVRs system [Header: [request identifier=User1@RS-INT] [request object="VR creation"] [allocation process=logical components allocation process]] [Data: [VR creation information: inter-VR routing process=BGP, customer routing process=OSPF, signalling=RSVP, forwarding=IPv4 forwarder, classifier=Y, scheduler=X, QoS Diffserv, management protocol=SNMP]]. Hence, the following steps are performed:

1. The policy manager 420, included in the autonomic network node system, analyses the VR provisioning request fields, generates policies and forwards them to the autonomic engine 410. The autonomic engine 410 analyses the policies and determines, first, the request identifier information. In this case, the request identifier does not already exist in the knowledge database 402, a new entry is then added related to the new request identifier (process-ID=User1@aRS-INT.
2. The autonomic engine retrieves next the request object, for instance "VR creation", and creates a new VR identifier (VR-ID@INT) and adds it in the knowledge database 402. Next, the autonomic engine creates at run time new VR-ACC manager 413 and new VR-AFC manager 414 for the new VR control and forwarding planes. The autonomic engine 410 creates new VR-ACC manager and VR-AFC manager identifiers and adds them to the knowledge database 402.
3. Next; the autonomic engine 410 retrieves the allocation process field included in the request, in our case: logical components allocation process. The autonomic engine retrieves the data information included in the provisioning request ([VR creation information: inter-VR routing process=BGP, customer routing process=OSPF, signalling=RSVP, forwarding=IPv4 forwarder, classifier=Y, scheduler=X, QoS diffserv, management protocol=SNMP]) and interacts with the logical components allocation entity 406 to allocate the required ARCs (3 ACCs OSPF, BGP and RSVP; 1 AMCs=SNMP; 4 AFCs=forwarderIPv4, classifierY, schedulerX, diffservQoS) from the AVRs-ARC library entity instances. The request sent from the autonomic engine 410 to the logical components allocation entity 406 includes the identifier of the required VR (VR-ID@INT).
4. Once the ARCs are allocated by the logical components allocation entity 406, their status will be stated as "allocated" and assigned to the appropriate VR-ID (VR-ID@INT) in the AVRs-ARC library databases.
5. The AVRs-AMC Library entity instance 407c sends the allocated AMC 103c (SNMP protocol) to the VR management plane 301.
6. The autonomic engine triggers the dynamic binding protocol for communication between the AVRs-ACC library 407a, AVRs-AFC library 407b, VR-ACC manager 413 and VR-AFC manager 414 entities to exchange and decide which ACCs, for example: OSPFinstance1, BGPinstance6 and RSVPinstance4 and AFCs, for example: ForwarderIPv4instance1, ClassifierY-instance2, SchedulerX-instance4, DiffservQoS-instance 3 will finally form the VR.
7. Next, the final and specific list of ARCs identifiers constituting the VR instance 104 is sent to the autonomic engine to update the knowledge database 402.
8. The VR-ACC manager 413 activates, next, the allocated ACCs 103a and informs them of the association list of AFC(s) 103b that they should communicate with inside the VR. Likewise, the VR-AFC manager activates the AFCs 103b and informs them of the association list of ACC(s) that they should communicate with inside the VR.
9. Finally, a standard protocol, such as the ForCES protocol, interconnects automatically the routing protocols (OSPF and BGP) and the forwarding functions (IPv4, diffserv . . . ) inside the VR instance 104 and updates the MIB tables, handled by SNMP, in the VR management plane 301.
10. Management information is exchanged between the SNMP modules, in the VR management plane, and the autonomic engine to enable the customer self-service to further manage, monitor and maintain the VR if the need arises. A notification request is then sent to the VNS customer to inform about successful creation of the VR.

An exemplary application of the autonomic network node system of the invention is related to virtual private networks (VPNs) networking and routing. According to [Andersson, L. and T. Madsen, "provider provisioned virtual private network (VPN) terminology", RFC 4026, March 2005.], two major VPN approaches are considered: provider provisioned based IP VPN and customer provisioned based IP VPN. In the provider provisioned based IP VPN approach, the service provider (SP) offers IP VPN services to its customers and is responsible for provisioning and managing the VPN service on behalf of the VPN customer. Whereas, in the customer provisioned based IP VPN approach, the IP VPN service is deployed and managed by the VPN customer. The VNSP is not involved with any particular VPN service function. The VPN edge router (ER) is defined by the VPN terminology to refer to an IP router that deploys and maintains the IP VPN service and functions and is responsible for routing and forwarding VPN traffic. The VPN edge router may be either located in the customer network (called customer edge (CE) router) interfacing with the VNSP network; or located at the edge of the VPN SP network (called provider edge (PE) router) interfacing with the customer's network. VPN tunnels are used to transport VPN traffic between VPN edge routers by encapsulating packets.

Three approaches are considered:
1. customer provisioning CE based IP VPN: where the customer provisions and manages the VPN service inside its CE routers.
2. provider provisioning CE based IP VPN: where the VPN service is provisioned and managed by the SP in the CE.
3. provider provisioning PE based IP VPN (called also provider provisioning network based IP VPN): where the SP provisions and manages the VPN service inside its PE routers.

This approach has been detailed in the prior state of the art in the description section.

The present invention of autonomic network node system providing autonomic virtual routers:

may improve the provider provisioning network based IP VPN approach (approach 3) by proposing automated provider provisioning network based IP VPNs approach related to the automated provider provisioning virtual routing services approach. This approach provides flexibility and reliability to deal with the dynamic aspect of mobile VPN users.

may introduce a new approach called automated customer self-provisioning network based IP VPNs related to the automated customer self-provisioning virtual routing services process by combining the first and third approaches. The customer provisions and manages the VPN service inside the PE routers located in the service provider (SP) network.

The automated customer self-provisioning network based IP VPNs approach may provide a scalable, flexible, high performance and secure framework to support networking in personal networks. A personal network (PN) concept is an extension of the personal area network (PAN) including all of a person's devices, nodes, services and applications. These may reside anywhere in the close vicinity of the user defined as the private PAN (P-PAN) and in personal clusters (such as the home, car and office cluster). The communication between the clusters may be achieved via interconnecting structures that can be public, private or shared wired/wireless networks. From the security point of view, the P-PAN should create a secure and self-configured connection to access any services in remote clusters within the PN. In order to provide such private and secure PN communication, virtual private networking may be needed to ensure connectivity over interconnecting structures. Secure cluster gateway nodes may be required in clusters to provide these communications with external networks.

Just like VPN users may require access to their Intranet and corporate accounts, a PN user may seek access to remote personal services and clusters, from anywhere, using any personal device and at any time in a private and secure manner. Virtual personal overlay networks (VPONs) have been recently introduced in [W. Louati and D. Zeghlache, "network based virtual personal overlay networks using programmable virtual routers", IEEE Communications Magazine, vol. 43, no. 8, August 2005, pages 86-94.] to designate virtual interconnecting network communications between personal clusters. The provider provisioned network based remote access VPON approach is proposed for networking in personal network. Virtual routing technology is used in the provider edge routers to provide per-VPON routing and forwarding capabilities. In this approach, the personal cluster may need to establish a voluntary remote access from the secure cluster gateways to the provider edge routers located in the VNSP network. As a result, secure concatenated tunnels may be established between remote clusters. This approach is scalable but a trust relationship may be required between the PN user and the VNSP that may see the PN traffic in the intermediate points (provider edge routers) of the concatenated tunnels.

A problem may be encountered if the PN user wants to benefit from the VNSP Network infrastructure (improve scalability) to forward its PN data, but does not trust its VNSP to see the PN traffic and the PN private addresses in virtual routers located in provider edge routers. To remove this limitation, a PN user self-service solution and an autonomic virtual routers system may be used to self-control VRs located in the provider edge routers. The PN user self-services may self-control, self-configure and self-manage the routing tables and tunnelling encryption and decryption functions installed in the VR (located in the provider edge router) without the intervention of the SP. The PN user self-service may remotely self-install and self-configure its VR control functionalities (Ipsec tunnelling, routing . . . ) by allocating or installing CCs/FCs via the autonomic engine installed in the autonomic network node system.

As far as mobility is concerned, the VNS customer moves and changes its attachment from an VNSP edge router to another; both may support the autonomic network node system. Based on an inter-AVRs communication, a copy of the virtual router instance configuration installed in the first edge router may be transferred to the visited edge router. A VR context information transfer may occur between the two edge routers supporting the autonomic network node system. The VR context may maintain all information about the VR configuration, parameters and so on. The autonomic aspect of the network node system may provide the required flexibility to the visited edge router to create a VR "copy" for the VNS customer without the intervention of any VNSP or VNS customer.

Other embodiments of the invention will be apparent to those skilled in the art from consideration of the specification and practice of the invention disclosed herein. It is intended that the specification and examples be considered as exemplary only.

| Abbreviations | |
|---|---|
| ACC | Autonomic Control Component |
| AFC | Autonomic Forwarding Component |
| AMC | Autonomic Management Component |
| ARC | Autonomic Router Component |
| ASP | Applications Service Provider |
| AVR | Autonomic Virtual Router |
| CE | Control Element |
| FE | Forwarding Element |
| FIB | Forwarding Information Base |
| IP | Internet Protocol |
| ISP | Internet Service Provider |
| LCP | Logical Control Partition |
| LFB | Logical function Block |
| LFP | Logical Forwarding Partition |
| MIB | Management Information Base |
| NAT | Network Address Translation |
| PAN | Personal Area Network |
| PIB | Policy Information Base |
| PN | Personal Network |
| PoP | Point of Presence |
| P-PAN | Private PAN |
| QoS | Quality of Service |
| RIB | Routing Information base |
| VRS | Virtual Routing Service |
| VNSP | Virtual Network Service Provider |
| SLA | Service Level Agreement |
| VN | Virtual Network |
| VPN | Virtual Private Network |
| VPON | Virtual Personal Overlay Network |
| VR | Virtual Router |
| VRF | Virtual Routing and Forwarding |

The invention claimed is

1. An autonomic network node system for providing at least one virtual router (VR) for providing on demand virtual routing service, the autonomic network node system comprising:
a plurality of autonomic router components (ARCs) configured for providing at least one virtual router (VR) instance, the ARCs comprising:
at least one autonomic control component (ACC) operating in a VR control plane, and
at least one autonomic forwarding component (AFC) operating in a VR forwarding plane,
physical resources comprising a plurality of logical resource partitions (LRPs) for performing the ARCs,
at least one database for storing network node system information relating to the plurality of ARCs and LRPs, and
an autonomic framework configured for
receiving through a system interface at least one request of on demand virtual routing service,
accessing at the at least one database,
based on the network node system information and the at least one request to provide the at least one requested virtual routing service,
allocating at least one LRP to perform at least one ARC to be installed in the autonomic network node system,
installing the at least one ARC in the autonomic network node system and allocating the installed ARC to provide the at least one requested on demand virtual routing service and/or,
allocating at least one already installed ARC,
and, updating the at least one database to store information relating to the allocated at least one ARC and/or the at least one LRP and to the provided on demand virtual routing service.

2. The autonomic network node system of claim 1, wherein the plurality of ARCs further comprises at least one autonomic management component (AMC) operating in a VR management plane.

3. The autonomic network node system of claim 1, wherein the network node system information comprise status information related to the plurality of LRPs and ARCs and identification information related to the plurality of LRPs, ARCs and the at least one VR instance.

4. The autonomic network node system of claim 1, wherein the at least one database comprises an ARC library for storing information related to the plurality of ARCs and a LRP library for storing information related to the plurality of LRPs.

5. The autonomic network node system of claim 1, wherein at least one ARC comprises at least one software component operating in the at least one virtual router on heterogeneous platforms and operating systems and wherein the at least one software component of an ARC is configured for dynamically interacting with at least one software component of a different ARC and based on input/output ports and interfaces, the at least one software component being at least one of self-configuring, self-adapting and self-organising software component.

6. The autonomic network node system of claim 1, wherein the plurality of LRPs comprises logical forwarding partitions (LFPs) and logical control partitions (LCPs).

7. The autonomic network node system of claim 1, comprising at least one AVRs-ACC manager associated with at least one ACC and at least one AVRs-AFC manager associated with at least one AFC.

8. The autonomic network node system of claim 2, comprising a VR-ACC manager associated with at least one ACC of the at least one VR instance and a VR-AFC manager associated with at least one AFC of the at least one VR instance, each VR instance having at least one LCP performing the at least one ACC and the at least one AMC and at least one LFP performing the at least one AFC.

9. The autonomic network node system of claim 1, wherein the autonomic framework comprises an autonomic engine comprising an autonomic manager and autonomous entities for operating the plurality of ARCs and LRPs.

10. The autonomic network node system of claim 9, wherein the at least one database comprises a knowledge database comprising entries related to at least one of:
process-identifier (Process-ID),
VR-ID
ARCs-ID list,
VR-ACC manager-ID,
VR-AFC manager-ID.

11. The autonomic network node system of claim 1, comprising a system interface for receiving provisioning requests for on demand virtual routing service, the system interface comprising a policy based management framework including a policy manager configured for:
receiving VR provisioning requests from a virtual network service provider (VNSP) manager, virtual network service (VNS) customers and at least one other router,
analysing the provisioning requests and generating policies forwarded to the autonomic framework.

12. The autonomic network node system of claim 1, comprising a system interface for receiving requests for on demand virtual routing service, wherein the system interface comprises an authentication, authorisation and accounting (AAA) module configured for authenticating VNS customers, authorising VNS customers to provision VRS and tracking consumption of router resources by VNS customers.

13. The autonomic network node system of claim 9, wherein the autonomic manager is configured for receiving policies from a policy manager running in the system interface, analysing policies and for operating the autonomous entities to provide the requested on demand virtual routing service based on these policies.

14. The autonomic network node system of claim 9, wherein the autonomous entities comprise a LRP state entity, the LRP state entity comprising an agent and a LRP status table, wherein each LRP status table comprises entries related to a LRP identifier and a LRP status.

15. The autonomic network node system of claim 14, wherein the autonomous entities comprise an ARC-LRP binding entity comprising an agent and an ARC-LRP binding table, wherein the ARC-LRP binding table comprises entries related to an ARC identifier and identifiers of at least one LRP performing the ARC.

16. The autonomic network node system of claim 14, wherein the autonomous entities comprise an AVRs-ARC library entity for storing information related to ARCs available in the autonomic network node system, the AVRs-ARC library entity comprising an agent and an AVRs-ARC library database, the AVRs-ARC library database comprising an ARC identifier, a status of this ARC and a VR identifier of a VR comprising the ARC.

17. The autonomic network node system of claim 14, wherein the autonomous entities comprise a physical resources allocation entity configured for allocating LRPs based on status information in the LRP status table, the physical resources allocation entity being configured for allowing installation of a new ARC in the autonomic network node system, creation of an ARC-ID for the new ARC in an ARC-LCP binding table and for updating an AVRs-ARC library database.

18. The autonomic network node system of claim 15, wherein the autonomous entities comprise a logical components allocation entity configured for transferring ARCs performed by LRPs from the ARC-LRP binding entity to an AVRs-ARC library entity and allocating ARCs based on their status in the AVRs-ARC library entity following an allocation procedure conducted by the autonomic engine.

19. The autonomic network node system of claim 14, wherein the LRP state entity and the ARC-LRP binding entity are configured for interacting to update their contents.

20. The autonomic network node system of claim 2, wherein an AVRs-ARC library entity comprises an AVR-AMC library entity instance, an AVR-ACC library entity instance and an AVR-AFC library entity instance related to the AMCs, ACCs and AFCs respectively.

21. The autonomic network node system of claim 7, wherein an AVRs-ARC library entity is configured for interacting with the AVRs-ACC manager and the AVRs-AFC manager.

22. The autonomic network node system of claim 16, wherein the AVRs-ARC library entity is configured for interacting with at least one VR management plane.

23. A method for providing at least one virtual router (VR) for providing on demand virtual routing service in a autonomic network node system comprising a plurality of ARCs configured for providing at least one VR instance, the ARCs comprising: at least one ACC operating in a VR control plane, and at least one AFC operating in a VR forwarding plane, physical resources comprising a plurality of LRPs for performing the ARCs, at least one database for storing network node system information relating to ARCs and LRPs, and a autonomic framework,
in which method, the autonomic framework receives at least one request of on demand virtual routing service through a system interface, accesses at the at least one database, based on the network node system information and the at least one request allocates at least one LRP to perform at least one ARC to be installed in the autonomic network node system, installs the at least one ARC in the autonomic network node system and allocates the installed ARC to provide the at least one requested virtual routing service, and/or allocates at least one already installed ARC to provide the at least one requested virtual routing service and, updates the at least one database to store information relating to the allocated at least one ARC and/or the at least one LRP and to on demand virtual routing service.

24. The method of claim 23, wherein the plurality of ARCs further comprises at least one AMC operating in a VR management plane.

25. The method of claim 23, wherein the request is received from a VNSP and in which the requested virtual routing service is provided without any intervention from a VNSP manager, or
wherein the request is received from a virtual routing service customer self service and wherein the requested virtual routing service is provided without any intervention from a VNSP manager.

26. The method of claim 23, wherein a physical resources allocation entity is configured for:
during an initial state, allocating LRPs from a ARC-LRP binding entity stated as "ready" in a LRP status table available to perform new ARCs to be installed in the network node system and provided by customers self-service or a VNSP manager in the network node system,
once LRPs are successfully allocated, executing the new required ARC, stating these LRPs as "allocated" in the LRP status table and installing the new ARC in the network node system, creating a ARC-ID for the new ARC in a ARC-LRP binding table and transferring the ARC-ID to a AVRs-ARC library entity with ARC status marked as "new".

27. The method of claim 23, wherein a logical components allocation entity is configured for:
during an initial state, transferring all ARCs performed by at least one LRP from a ARC-LRP binding entity to a AVRs-ARC library entity,
during an autonomic state, allocating ARCs stated as "ready" from the AVRs-ARC library entity following an allocation procedure conducted by the autonomic engine.

28. The method of claim 23, wherein the received request comprises at least one of:
a request identifier comprising at least one of a customer or VNSP identifier, a membership identifier and a process type information of the requested service provided,
a "VR creation" request object, in which method a VR instance is created for the customer if no VR instance is already installed in the network node system
a "VR configuration" request object, in which method ARC components in a VR instance already installed in the network node system are configured and/or changed,
a "VR removal" request object, in which method a VR instance already installed in the network node system is removed,
a "value added service deployment in VR" request object, in which method the need for deploying new services in an already created VR instance is informed,
a logical components allocation process, in which method a VNSP manager or a customer self-service allocates at least one ARC component available in the autonomic network node system.

29. The method of claim 23, wherein:
the received request comprises a data part; and
a autonomic manager, based on the data part, allocates at least one required ARC from a AVRs-ARC library entity via a logical components allocation entity.

30. The method of claim 23, wherein:
the received request comprises a physical resources allocation process in which a VNSP manager or a customer self-service allocates a plurality of LRPs to install their own ARCs in the autonomic network node system; and
the received request comprises a data part comprising ARCs software codes, and wherein a autonomic manager allocates at least one LRP from a ARC-LRP binding entity, via the physical resources allocation entity, to install the ARCs software codes.

31. A non-transitory computer readable medium storing instructions that, when executed by a computer system, perform a method for providing at least one virtual router (VR) for providing on demand virtual routing service in an autonomic network node system comprising a plurality of autonomic router components (ARCs), the instructions causing the computer to execute the method comprising:

receiving, by the autonomic framework, at least one request of on demand virtual routing service through a system interface, accessing, by the autonomic framework, at least one database, allocating, based on the network node system information and the at least one request, at least one) logical resource partition (LRP) to perform at least one ARC to be installed in the autonomic network node system, installing the at least one ARC in the autonomic network node system;

allocating the installed ARC to provide the at least one requested on demand virtual routing service and/or allocating at least one already installed ARC to provide the at least one requested on demand virtual routing service, and updating the at least one database to store information relating to the allocated at least one ARC and/or the at least one LRP, and to the on demand virtual routing service.

* * * * *